(12) United States Patent
Kim et al.

(10) Patent No.: US 12,731,290 B2
(45) Date of Patent: Sep. 8, 2026

(54) DEVICE AND METHOD FOR ACQUIRING IMAGES

(71) Applicant: SAMSUNG ELECTRONICS CO., LTD., Suwon-si (KR)

(72) Inventors: Woo-Shik Kim, Suwon-si (KR); Sangyoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 18/813,898

(22) Filed: Aug. 23, 2024

(65) Prior Publication Data

US 2025/0285330 A1 Sep. 11, 2025

(30) Foreign Application Priority Data

Mar. 6, 2024 (KR) ........................ 10-2024-0032216

(51) Int. Cl.

*G06T 7/80* (2017.01)
*G06T 7/33* (2017.01)
*H04N 23/10* (2023.01)

(52) U.S. Cl.

CPC ................ *G06T 7/80* (2017.01); *G06T 7/337* (2017.01); *H04N 23/10* (2023.01); *G06T 2207/10024* (2013.01); *G06T 2207/20081* (2013.01); *G06T 2207/20084* (2013.01); *G06T 2207/30244* (2013.01)

(58) Field of Classification Search

CPC . G06T 7/80; G06T 7/337; G06T 2207/10024; G06T 2207/20081; G06T 2207/20084; G06T 2207/30244; H04N 23/10; H04N 25/673; H04N 23/15; H04N 23/45; H04N 23/54; H04N 23/71; H04N 25/135; G06N 3/08

See application file for complete search history.

(56) References Cited

U.S. PATENT DOCUMENTS

2021/0274108 A1* 9/2021 Kírísken ............... H04N 23/11
2022/0264032 A1 8/2022 Yoon et al.
2022/0385864 A1 12/2022 Kim
2024/0179428 A1 5/2024 After et al.

FOREIGN PATENT DOCUMENTS

CN 115511972 A 12/2022
CN 113676639 B 3/2023
KR 10-2021-0070801 A 6/2021
KR 10-2022-0159829 A 12/2022

* cited by examiner

*Primary Examiner* — Ahmed A Berhan
(74) *Attorney, Agent, or Firm* — Sughrue Mion, PLLC

(57) ABSTRACT

An image acquisition device, including: a multispectral image sensor configured to acquire a first image using four or more channels; a red-green-blue (RGB) image sensor configured to acquire a second image using a red (R) channel, a green (G) channel, and a blue (B) channel; and a processor configured to perform calibration on the acquired first image, based on a guided image generated based on the second image.

19 Claims, 17 Drawing Sheets

1000
90
72
82
80
83a
83b
83c
83d
81
71
61b
61
62
65
61a
52
51

4100
4110
4110
4110
F1
(UV1)
F3
(B1)
F5
(B3)
F7
(G2)
F2
(UV2)
F4
(B2)
F6
(G1)
F8
(G3)
F9
(G4)
F11
(G6)
F13
(R2)
F15
(NIR1)
F10
(G5)
F12
(R1)
F14
(R3)
F16
(NIR2)

100
200
MULTISPECTRAL IMAGE SENSOR
300
PROCESSOR
500
RGB SENSOR

900
START
ACQUIRE FIRST IMAGE USING MULTISPECTRAL IMAGE SENSOR
910
ACQUIRE SECOND IMAGE USING RGB SENSOR
920
PERFORM CALIBRATION ON FIRST IMAGE BASED ON GUIDED IMAGE GENERATED BASED ON SECOND IMAGE
930
END

930
START
ACQUIRE GUIDED IMAGE BASED ON SECOND IMAGE
931
PERFORM REGISTRATION ON GUIDED IMAGE BASED ON FIRST IMAGE
932
CALIBRATE FIRST IMAGE BASED ON GUIDED IMAGE
933
END

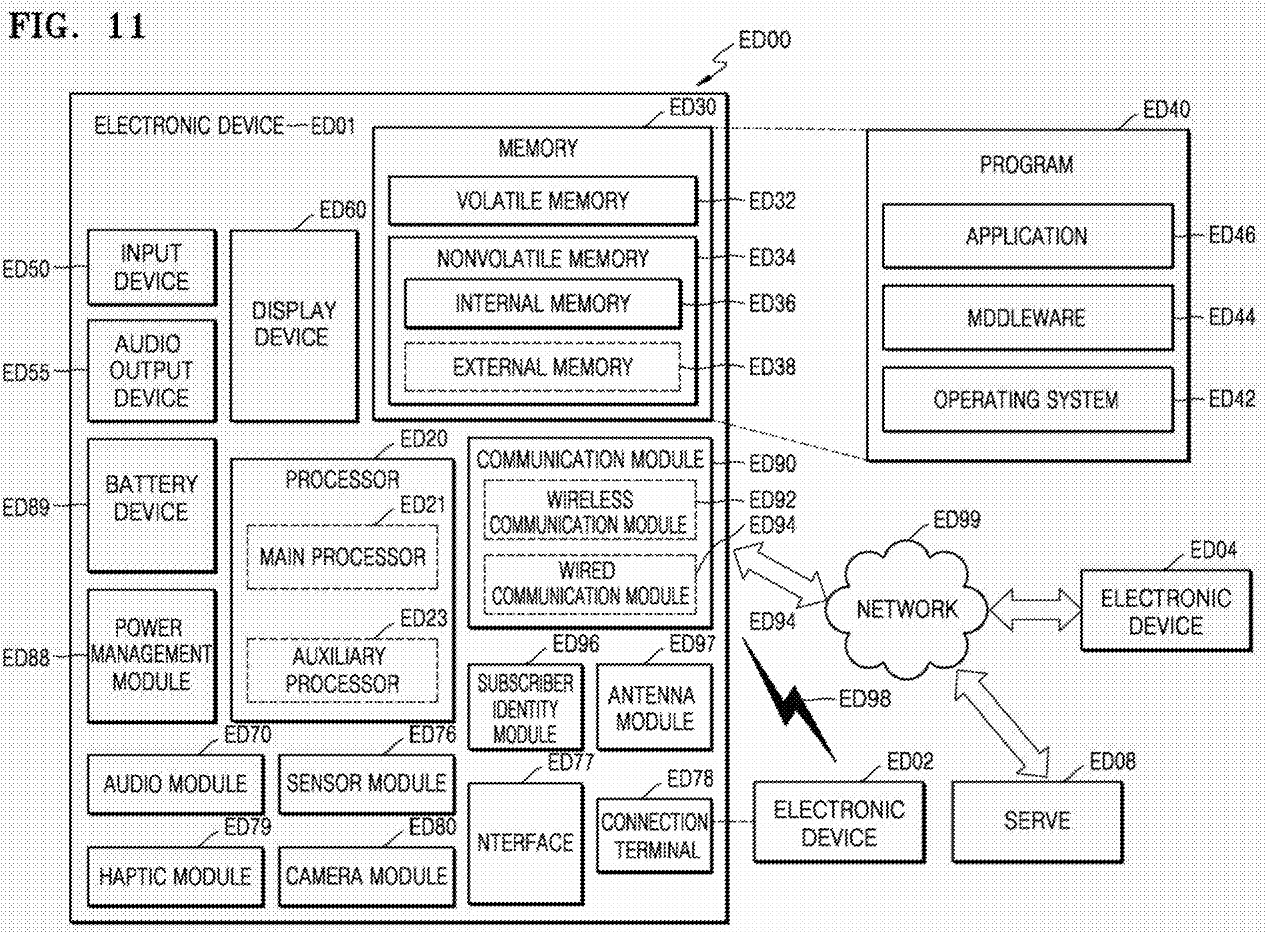
FIG. 11
ED00
ELECTRONIC DEVICE—ED01
ED30
MEMORY
VOLATILE MEMORY
ED32
NONVOLATILE MEMORY
ED34
INTERNAL MEMORY
ED36
EXTERNAL MEMORY
ED38
ED40
PROGRAM
APPLICATION
ED46
MDDLEWARE
ED44
OPERATING SYSTEM
ED42
ED60
DISPLAY DEVICE
ED50
INPUT DEVICE
ED55
AUDIO OUTPUT DEVICE
ED89
BATTERY DEVICE
ED88
POWER MANAGEMENT MODULE
ED20
PROCESSOR
ED21
MAIN PROCESSOR
ED23
AUXILIARY PROCESSOR
COMMUNICATION MODULE
ED90
WIRELESS COMMUNICATION MODULE
ED92
WIRED COMMUNICATION MODULE
ED94
ED96
SUBSCRIBER IDENTITY MODULE
ED97
ANTENNA MODULE
ED70
AUDIO MODULE
ED76
SENSOR MODULE
ED77
NTERFACE
ED78
CONNECTION TERMINAL
ED79
HAPTIC MODULE
ED80
CAMERA MODULE
ED99
NETWORK
ED94
ED04
ELECTRONIC DEVICE
ED98
ED02
ELECTRONIC DEVICE
ED08
SERVE ED80
CM20
FLASH
CM60
CM10
CM30
IMAGE SENSOR
LENS ASSEMBLY
IMAGE SIGNAL PROCESSOR
CM40
IMAGE STABILIZER
CM50
MEMORY 5600
5700
[Security]
(a)
(b)
5800
5900
(c)
(d)
6000
6020
6010
6030
6040
(e)

DEVICE AND METHOD FOR ACQUIRING IMAGES

CROSS-REFERENCE TO RELATED APPLICATION

This application is based on and claims priority under 35 U.S.C. § 119 to Korean Patent Application No. 10-2024-0032216, filed on Mar. 6, 2024, in the Korean Intellectual Property Office, the disclosure of which is incorporated by reference herein in its entirety.

BACKGROUND

1. Field

The disclosure relates to a device and method for acquiring images.

2. Description of the Related Art

Image sensors may be devices that receive light incident from a subject and photoelectrically convert the received light to generate an electrical signal.

For color expression, image sensors may use a color filter including an array of filter elements that selectively transmit different bands of light. Image sensors may sense an amount of light passing through each filter element and then form a color image of a subject using image processing.

Due to problems or limitations in a manufacturing process, pixels of image sensors may be manufactured unevenly for each image sensor. The pixels of the image sensors may be disposed at specific positions on pixel arrays, which may cause distortion to occur in a particular pattern in images acquired by the image sensors.

SUMMARY

Provided are an image acquisition device and a method of acquiring an image. The technical objectives to be achieved by the disclosure are not limited to the technical objectives described above, and other technical objectives may be inferred from the following embodiments.

Additional aspects will be set forth in part in the description which follows and, in part, will be apparent from the description, or may be learned by practice of the presented embodiments of the disclosure.

In accordance with an aspect of the disclosure, an image acquisition device includes: a multispectral image sensor configured to acquire a first image using four or more channels; a red-green-blue (RGB) image sensor configured to acquire a second image using a red (R) channel, a green (G) channel, and a blue (B) channel; and a processor configured to perform calibration on the acquired first image, based on a guided image generated based on the second image.

The processor may be further configured to generate the guided image based on a channel signal corresponding to at least one of the R channel, the G channel, and the B channel.

The processor may be further configured to: perform registration on the first image to obtain a registered first image, and perform the registration on the second image to obtain a registered second image, and generate the guided image based on the registered second image on which the registration has been performed with respect to the registered first image.

The processor may be further configured to perform the registration using an affine transformation based on external factors of the multispectral image sensor and the RGB image sensor, and the external factors may include at least one of positions, posture information, angles of view, and focal lengths of the multispectral image sensor and the RGB image sensor.

The processor may be further configured to perform the registration on the first image and the second image by at least one of performing feature matching on the first image and the second image and calculating an optical flow between the first image and the second image.

The processor may be further configured to: generate the guided image based on at least one of a first channel signal and a second channel signal acquired by converting the first channel signal into at least one color space from among a YCbCr color space, an XYZ color space, and an L*a*b* color space, wherein the first channel signal may include at least one of an R channel signal corresponding to the R channel, a G channel signal corresponding to the G channel, and a B channel signal corresponding to the B channel, and the second channel signal may include a Y component or an L* component corresponding to illuminance.

The processor may be further configured to: generate three or more candidate guided images based on the first channel signal, select a guided image corresponding to each channel of the four or more channels from among the three or more candidate guided images based on wavelength bands corresponding to the three or more candidate guided images, and perform the calibration on the first image, based on the selected guided image, and the first channel signal may include at least one of an R channel signal corresponding to the R channel, a G channel signal corresponding to the G channel, and a B channel signal corresponding to the B channel.

The processor may be further configured to: transform an entire region or a local region of the generated guided image, based on properties of the multispectral image sensor, and perform the calibration on the first image, based on the transformed guided image, and the properties of the multispectral image sensor include at least one of resolution, dynamic range, and sharpness.

The processor may be further configured to: perform registration on the generated guided image based on the first image to obtain a registered guided image, and perform the calibration on the first image based on the registered guided image.

The processor may be further configured to: detect luminance of each first pixel of a plurality of first pixels included in the first image to calculate a first luminance variation between first adjacent pixels of the plurality of first pixels, detect luminance of each second pixel of a plurality of second pixels of the registered guided image to calculate a second luminance variation between second adjacent pixels of the plurality of second pixels, and calibrate the first luminance variation to be equal to the second luminance variation, with respect to each first pixel of the plurality of first pixels, and positions of the plurality of second pixels within the registered guided image may correspond to positions of the plurality of first pixels within the first image.

The processor may be further configured to perform the calibration on the first image by using a guided filter, and the guided filter may be configured to linearly process the first image based on the registered guided image.

The processor may be further configured to: detect at least one of a range and a shape of a wavelength included in a spectrum of light incident on the image acquisition device based on the first image, perform first calibration on the first image based on fixed pattern noise corresponding to the range or the shape to obtain a calibrated first image, and perform second calibration on the calibrated first image based on the guided image.

The processor may be further configured to: detect at least one of a range and a shape of a wavelength included in a spectrum of light incident on the image acquisition device based on the first image, generate a first correction image by performing first calibration on the first image based on fixed pattern noise corresponding to the range or the shape, generate a second correction image by performing second calibration on the first image based on the guided image, and obtain a weighted sum of the first correction image and the second correction image.

The processor may be further configured to perform the calibration on the first image by inputting the acquired first image and the acquired second image into a deep learning network to obtain a calibrated first image, the deep learning network may include network parameters determined using a pair of the first image and the second image, and the deep learning network may be trained using, as a loss function, an error based on the first image and the calibrated first image.

In accordance with an aspect of the disclosure, an image acquisition device includes: a multispectral image sensor configured to acquire a first image using four or more channels; and a processor configured to: detect a band or a shape of a wavelength included in a spectrum of light incident on the image acquisition device based on the first image, and perform calibration on the first image based on fixed pattern noise corresponding to the band or the shape.

In accordance with an aspect of the disclosure, a method, performed by an image acquisition device, of acquiring an image, includes: acquiring a first image using four or more channels by using a multispectral image sensor; acquiring a second image using a red (R) channel, a green (G) channel, and a blue (B) channel from a red-green-blue (RGB) image sensor; and performing calibration on the acquired first image based on a guided image generated based on the second image.

The performing of the calibration may include: generating the guided image based on at least one of a first channel signal and a second channel signal acquired by converting the first channel signal into at least one color space from among a YCbCr color space, and XYZ color space, and an L*a*b* color space, the first channel signal may include at least one of an R channel signal corresponding to the R channel, a G channel signal corresponding to the G channel, and a B channel signal corresponding to the B channel, and the second channel signal may include a Y component or an L* component representing illuminance.

The performing of the calibration may include generating three or more candidate guided images, based on the first channel signal; selecting a guided image corresponding to each of the four or more channels from the three or more candidate guided images, based on wavelength bands corresponding to the three or more candidate guided images; and performing the calibration on the first image, based on the selected guided image, and the first channel signal may include at least one of an R channel signal corresponding to the R channel, a G channel signal corresponding to the G channel, and a B channel signal corresponding to the B channel.

The performing of the calibration may include detecting a range or a shape of a wavelength included in a spectrum of light incident on the image acquisition device, based on the first image;

performing first calibration on the first image, based on fixed pattern noise corresponding to the range or the shape to obtain a calibrated first image; and performing second calibration on the calibrated first image based on the guided image.

The performing of the calibration may include: detecting a range or a shape of a wavelength included in a spectrum of light incident on the image acquisition device based on the first image; generating a first correction image by performing first calibration on the first image based on fixed pattern noise corresponding to the range or the shape; generating a second correction image by performing second calibration on the first image based on the guided image; and obtaining a weighted sum of the first correction image and the second correction image.

In accordance with an aspect of the disclosure, an image acquisition device includes: a first image sensor configured to acquire a first image corresponding to a first plurality of channels; a second image sensor configured to acquire a second image corresponding to second plurality of channels, wherein a number of the second plurality of channels is smaller than a number of the first plurality of channels; and a processor configured to: generate a guided image based on the second image, and perform calibration on the first image by correcting a distortion included in the first image based on the guided image.

The processor may be further configured to correct the distortion based on fixed pattern noise corresponding to a range or a shape of a wavelength included in a spectrum of light incident on the image acquisition device.

The processor may be further configured to correct the distortion by providing the first image and the guided image as inputs to a deep learning network.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a block diagram showing a configuration of an electronic device, according to an embodiment;

DETAILED DESCRIPTION

Figure 1:
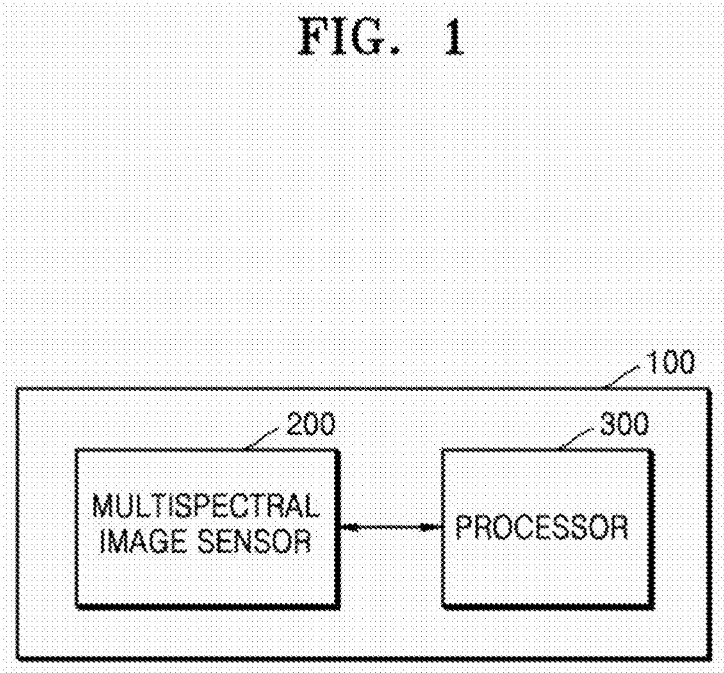
FIG. 1 is a block diagram of an image acquisition device according to an embodiment.

Reference will now be made in detail to embodiments, examples of which are illustrated in the accompanying drawings, wherein like reference numerals refer to like elements throughout. In this regard, embodiments of the present disclosure may have different forms and should not be construed as being limited to the descriptions set forth herein. Accordingly, the embodiments are merely described below, by referring to the figures, to explain some aspects of the present disclosure. As used herein, the term "and/or" includes any and all combinations of one or more of the associated listed items. Expressions such as "at least one of," when preceding a list of elements, modify the entire list of elements and do not modify the individual elements of the list.

All terms including descriptive or technical terms which are used herein should be construed as having meanings understood by one of ordinary skill in the art. However, the terms may have different meanings according to the intention of one of ordinary skill in the art, legal precedent, or the appearance of new technologies. Also, some terms may be arbitrarily selected, and such terms may be described in detail in the detailed description of relevant embodiments. Thus, the terms used herein should not be defined simply as the names of the terms, but should be defined based on the meaning of the terms together with the description throughout the embodiments.

In the descriptions of the embodiments, when a component is connected to another component, the component may not only be directly connected to the other component, but may also be electrically connected to the other component with another component in between. The singular forms "a," "an," and "the" as used herein are intended to include the plural forms as well unless the context clearly indicates otherwise. Also, it should be understood that when a portion is referred to as "including" another component, it may not exclude the other component but may further include the other component unless otherwise described.

The terms such as "comprise" or "include" used herein should not be construed as necessarily including all of various components or operations described herein, and should be construed as meaning that some of the components or operations may not be included or additional components or operations may be further included.

In addition, the terms including ordinal numbers such as "first" or "second" used herein may be used to describe various components, but the components should not be limited by the terms. These terms may be used only to distinguish one component from another.

The description of the following embodiments should not be construed as limiting the scope of rights, and information that may be easily inferred by those of ordinary skill should be construed as falling within the scope of rights of the embodiments. Hereinafter, embodiments for illustrative purposes only are described in detail below with reference to the accompanying drawings.

FIG. 1 is a block diagram of an image acquisition device 100 according to an embodiment. Referring to FIG. 1, the image acquisition device 100 according to an embodiment may include a multispectral image sensor 200 and a processor 300. The image acquisition device 100 of FIG. 1 is illustrated as including only the multispectral image sensor 200 and the processor 300, but is not limited thereto. It may be understood by those of ordinary skill in the art related to the present embodiments that some of the components shown in FIG. 1 may be omitted or new components (e.g., a memory) may be further included according to the design of the image acquisition device 100. Hereinafter, the operation of each component included in the image acquisition device 100 is described without limiting the space where each component is located.

Figure 2A:
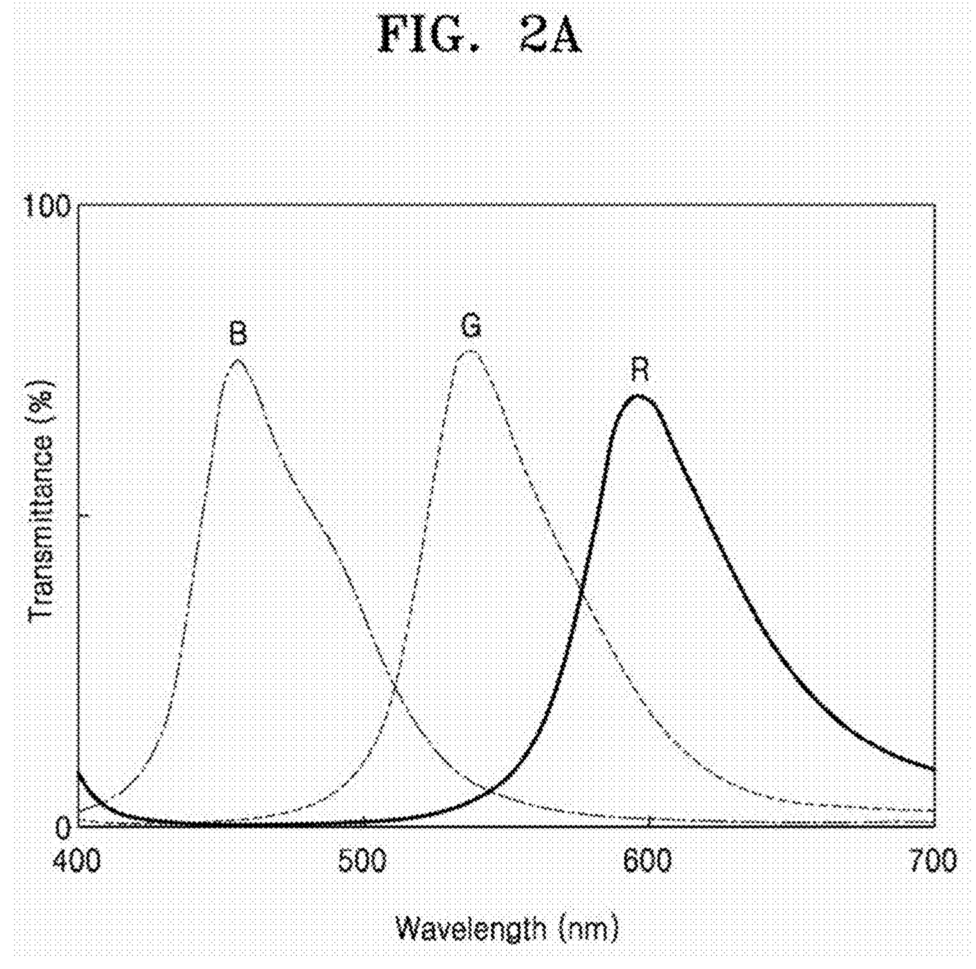
FIG. 2A is a diagram of a wavelength spectrum of a red-green-blue (RGB) sensor, according to an embodiment.
Figure 2B:
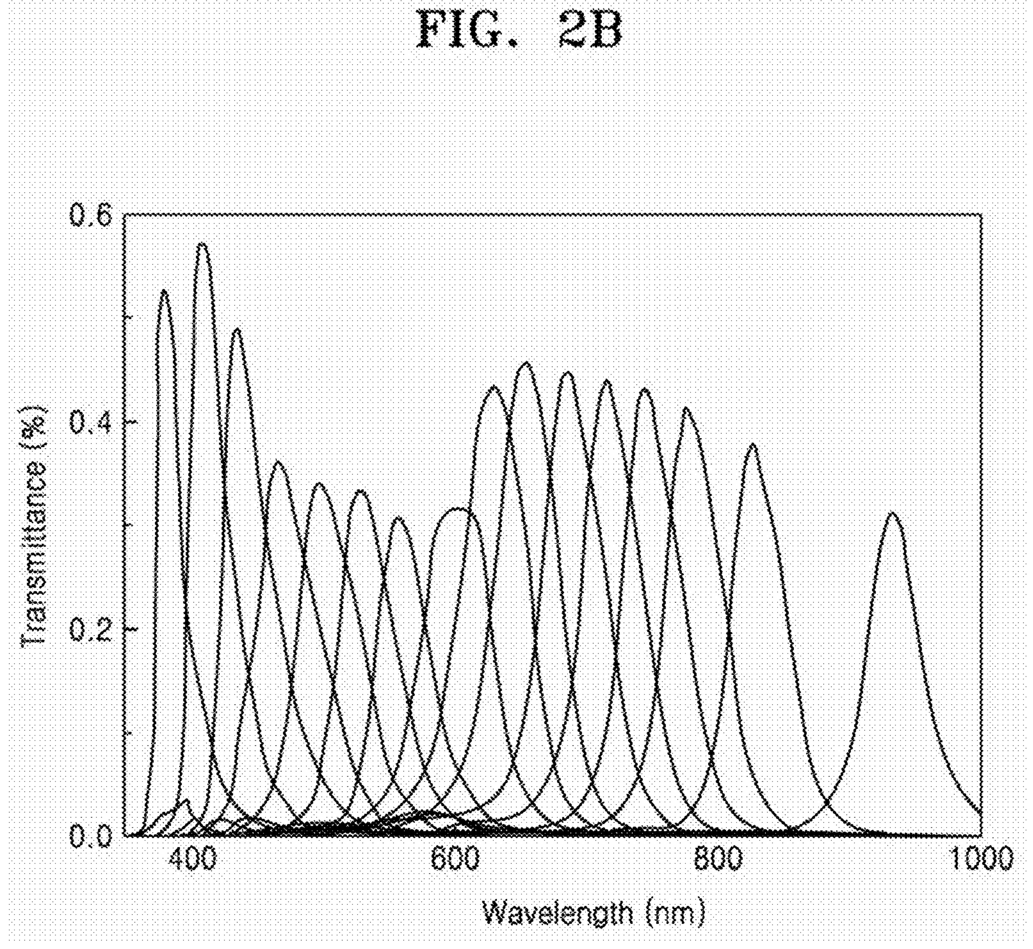
FIG. 2B is a diagram of a wavelength spectrum of a multispectral image sensor, according to an embodiment.
Figure 2C:
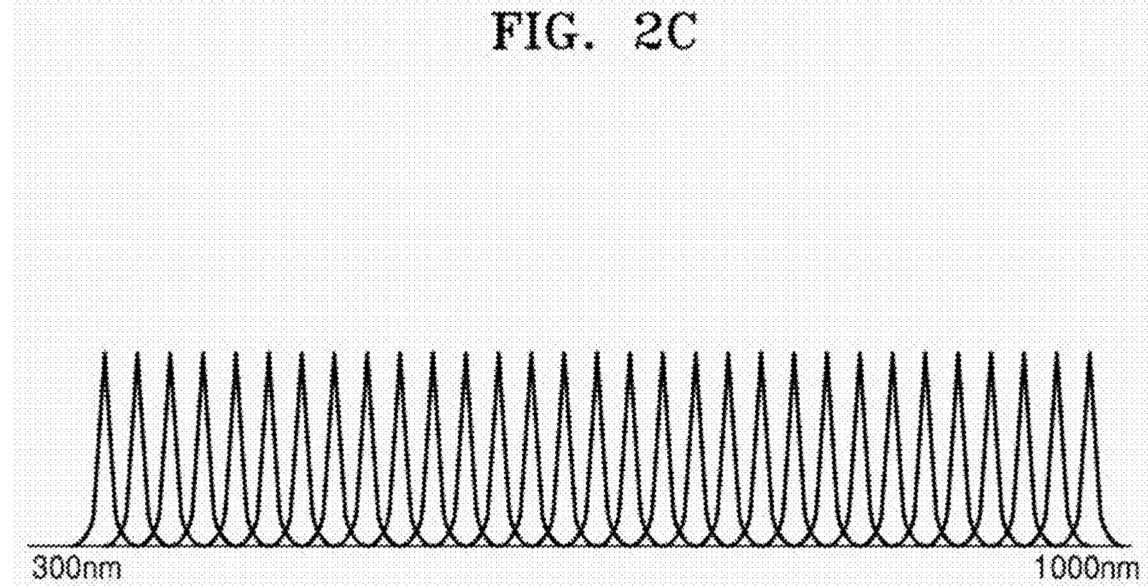
FIG. 2C is a diagram of a wavelength spectrum of a multispectral image sensor, according to an embodiment.

The multispectral image sensor 200 may be a sensor that senses light in various types of wavelength bands. For example, the multispectral image sensor 200 may sense light in more types of wavelength bands than a red-green-blue (RGB) sensor. FIG. 2A is a diagram of a wavelength spectrum of a RGB sensor, according to an embodiment. Referring to FIG. 2A, the RGB sensor may include an R channel, a G channel, and a B channel, and the RGB sensor may sense light in wavelength bands respectively corresponding to the three channels. FIG. 2B is a diagram of a wavelength spectrum of a multispectral image sensor, according to an embodiment. FIG. 2C is a diagram of a wavelength spectrum of a multispectral image sensor, according to another embodiment. Referring to FIGS. 2B and 2C, the multispectral image sensor 200 may include sixteen channels or thirty-one channels. However, the number of channels included in the multispectral image sensor 200 is not limited thereto, and the multispectral image sensor 200 may include any number of channels, for example four or more.

The multispectral image sensor 200 may adjust a central wavelength, a bandwidth, and a transmission amount of light absorbed through each channel. For example, a bandwidth of each channel of the multispectral image sensor 200 may be set to be less than the bandwidths of the R channel, the G channel, and the B channel. As another example, the entire bandwidth, for example a sum of the bandwidths of all channels, of the multispectral image sensor 200 may include and may be set to be greater than the entire bandwidth of the RGB sensor. As another example, an image acquired by the multispectral image sensor 200 may be a multispectral or hyperspectral image. The multispectral image sensor 200 may acquire an image by dividing wavelength bands including a visible light band, an infrared band, and an ultraviolet light band into a plurality of bands through a plurality of channels. The multispectral image sensor 200 may acquire an image by using all available channels, and may also acquire an image by selecting a specific channel.

The multispectral image sensor 200 may include at least one of a complementary metal oxide semiconductor (CMOS) image sensor and a charge coupled device (CCD) image sensor. Hereinafter, an example of a structure of the multispectral image sensor 200 of FIG. 1 is described in detail with reference to FIGS. 3 and 4.

Figure 3:
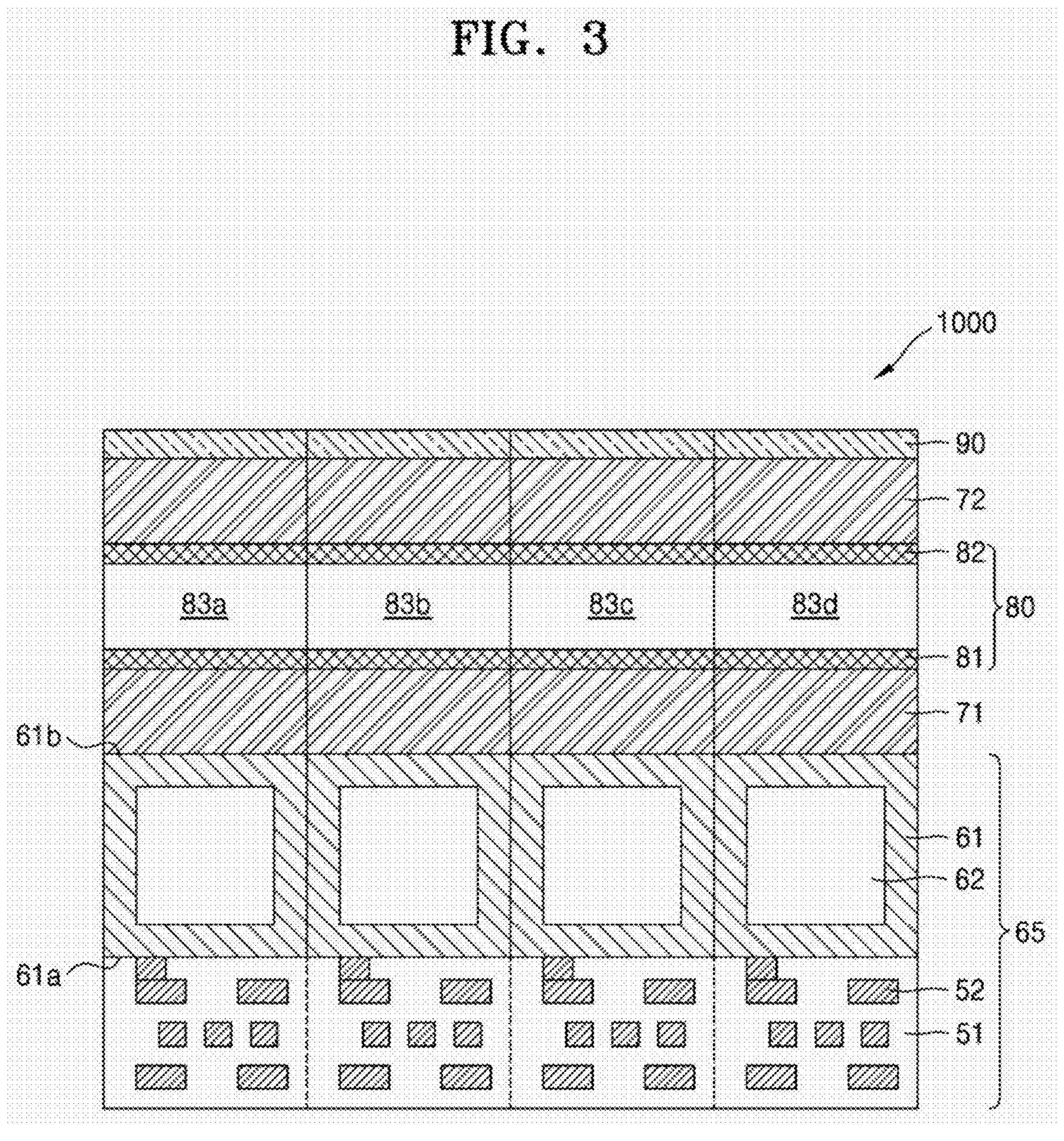
FIG. 3 is a cross-sectional view of a multispectral image sensor of FIG. 1, according to an embodiment.

FIG. 3 is a cross-sectional view of a multispectral image sensor 1000 according to an embodiment. Referring to FIG. 3, the multispectral image sensor 1000 may include a pixel array 65 and a resonator structure 80 provided on the pixel array 65. Here, the pixel array 65 may include a plurality of pixels arranged in two dimensions, and the resonator structure 80 may include a plurality of resonators provided to correspond to the plurality of pixels. FIG. 3 shows an example in which the pixel array 65 includes four pixels, and the resonator structure 80 includes four resonators, but embodiments are not limited thereto.

Each pixel of the pixel array 65 may include a photodiode 62, which may be a photoelectric conversion element, and a driving circuit 52 for driving the photodiode 62. The photodiode 62 may be provided to be buried in a semiconductor substrate 61. For example, a silicon substrate may be used as the semiconductor substrate 61. However, embodiments are not limited thereto. A wiring layer 51 may be provided on a lower surface 61*a* of the semiconductor substrate 61, and the driving circuit 52, such as a metal-oxide-semiconductor field-effect transistor (MOSFET), may be provided inside the wiring layer 51.

The resonator structure 80 including the plurality of resonators may be provided on an upper portion of the semiconductor substrate 61. Each of the resonators may transmit light in a specific desired wavelength region. Each of the resonators may include a first reflective layer 81 and a second reflective layer 82 spaced apart from each other, and cavities 83*a*, 83*b*, 83*c*, and 83*d* provided between the first reflective layer 81 and the second reflective layer 82. Each of the first reflective layer 81 and the second reflective layer 82 may include, for example, a metal reflective layer or a Bragg reflective layer. Each of the cavities 83*a*, 83*b*, 83*c*, and 83*d* may resonate light in a specific desired wavelength region.

A first functional layer 71 may be provided between an upper surface of the semiconductor substrate 61 and the resonator structure 80. For example, the first functional layer 71 may improve the transmittance of light passing through the resonator structure 80 toward the photodiode 62. To this end, the first functional layer 71 may include a dielectric layer or dielectric pattern with an adjusted refractive index.

A second functional layer 72 may be provided on an upper surface of the resonator structure 80. For example, the second functional layer 72 may improve the transmittance of light incident toward the resonator structure 80. To this end, the second functional layer 72 may include a dielectric layer or dielectric pattern with an adjusted refractive index. A third functional layer 90 may be further provided on an upper surface of the second functional layer 72. The third functional layer 90 may include, for example, an anti-reflective layer, a focusing lens, a color filter, a short-wavelength absorption filter, or a long-wavelength blocking filter. However, this is merely an example, and embodiments are not limited thereto.

Figure 4:
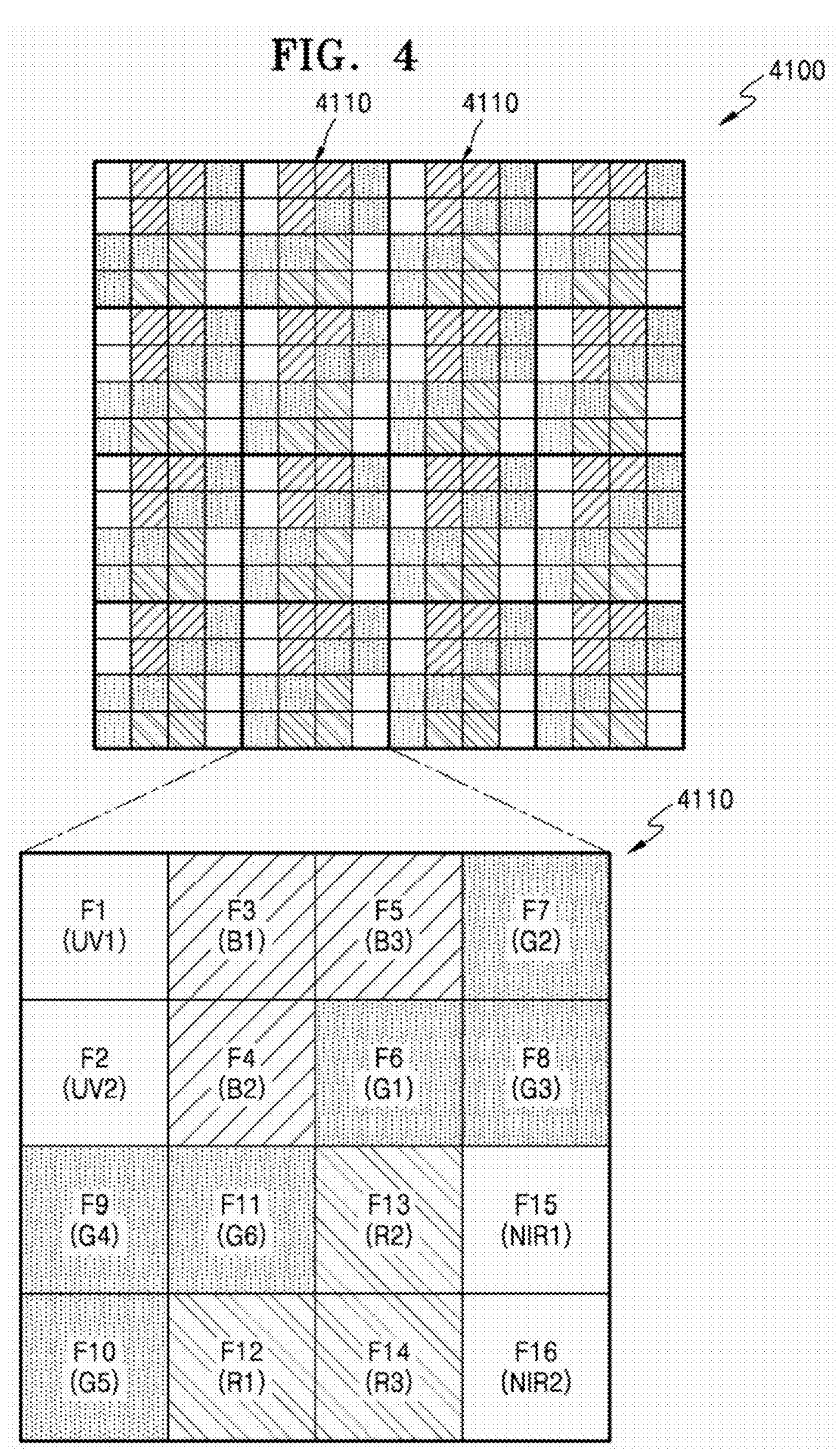
FIG. 4 is a diagram of a pixel array and filter groups of the multispectral image sensor of FIG. 1, according to an embodiment.

At least one of the first functional layer 71, the second functional layer 72, and the third functional layer 90 described above may be included in a spectral filter together with the resonator structure 80. FIG. 4 is a diagram of a pixel array 4100 and filter groups 4110 of the multispectral image sensor 200 of FIG. 1. The filter groups 4110 of FIG. 4 may be applied to a spectral filter of FIG. 3.

Referring to FIG. 4, a spectral filter 120 provided in the pixel array 4100 may include the plurality of filter groups 4110 arranged in a two-dimensional form. In this case, each of the filter groups 4110 may include sixteen unit filters F1 to F16 arranged in a 4×4 array form. However, embodiments are not limited thereto. For example, each of the filter groups 4110 may include nine unit filters arranged in a 3×3 array form, may include 25 unit filters arranged in a 5×5 array form, or may include M×N unit filters arranged in an M×N array form (where M and N are integers greater than or equal to 1).

According to an example, when each of the filter groups 4110 is arranged in a 4×4 array form, the first and second unit filters F1 and F2 may have center wavelengths UV1 and UV2 in an ultraviolet region, respectively, and the third to fifth unit filters F3 to F5 may have center wavelengths B1 to B3 in a blue light region, respectively. The sixth to eleventh unit filters F6 to F11 may have center wavelengths G1 to G6 in a green light region, respectively, and the twelfth to fourteenth unit filters F12 to F14 may have center wavelengths R1 to R3 in a red light region, respectively. In addition, the fifteenth and sixteenth unit filters F15 and F16 may have center wavelengths NIR1 and NIR2 in a near-infrared region, respectively.

According to another example, when each of the filter groups 4110 is arranged in a 3×3 array form, the first and second unit filters may have center wavelengths in the ultraviolet region, respectively, and the fourth, fifth, and seventh filters may have center wavelengths in the blue light region, respectively. The third and sixth unit filters may have center wavelengths in the green light region, respectively, and the eighth and ninth unit filters may have center wavelengths in the red light region, respectively.

Also, according to another example, when each of the filter groups 4110 is arranged in a 5×5 array form, the first to third unit filters may have center wavelengths in the ultraviolet region, respectively, and the sixth, seventh, eighth, eleventh, and twelfth unit filters may have center wavelengths in the blue light region, respectively. The fourth, fifth, and ninth unit filters may have center wavelengths in the green light region, respectively, and the tenth, thirteenth, fourteenth, fifteenth, eighteenth, and nineteenth unit filters may have center wavelengths in the red light region, respectively. In addition, the twelfth, twenty-third, twenty-fourth, and twenty-fifth unit filters may have center wavelengths in the near-infrared region, respectively.

The aforementioned unit filters provided in the spectral filter 120 may have a resonance structure having two reflectors, and a transmission wavelength band may be determined according to characteristics of the resonance structure. The transmission wavelength band may be adjusted according to a material of a reflector, a material of a dielectric material in the cavity, and a thickness of the cavity. In addition, a structure using grating and a structure using a distributed Bragg reflector (DBR) may be applied to the unit filters. Moreover, pixels of the pixel array 4100 may be arranged in various forms according to color characteristics of the multispectral image sensor 200.

Returning to FIG. 1, the processor 300 may control the overall operations of the image acquisition device 10. The processor 300 may include one processor core (e.g., a single core) or may include a plurality of processor cores (e.g., a multi-core). The processor 300 may process or execute programs and/or data stored in a memory. For example, the processor 300 may control the functions of the image acquisition device 100 by executing the programs stored in the memory.

The memory may be hardware storing or configured to store various types of data processed within the image acquisition device 100. For example, the memory may store images acquired from the multispectral image sensor 200. The memory may be a line memory sequentially storing images in line units or may be a frame buffer storing the entire image. In addition, the memory may store applications, drivers, etc. to be driven by the image acquisition device 100. The memory may include random access memory (RAM) such as dynamic RAM (DRAM) or static RAM (SRAM), read-only memory (ROM), electrically erasable programmable ROM (EEPORM), a compact disc (CD)-ROM, Blu-Ray, another optical disk storage, a hard disk drive (HDD), a solid-state driver (SSD), or flash memory. However, embodiments are not limited thereto.

The memory may be located outside the multispectral image sensor 200 or may be integrated inside the multispectral image sensor 200. When the memory is integrated inside the multispectral image sensor 200, the memory may be integrated together with a circuit portion. A pixel portion and other portions (e.g., a circuit portion and a memory) may each be integrated into one stack and may thus form a total of two stacks. In this case, the multispectral image sensor 200 may be formed as one chip including two stacks. However, embodiments are not limited thereto. The multispectral image sensor 200 may also be implemented as a three-stack having three layers including a pixel portion, a circuit portion, and a memory.

In addition, the circuit portion included in the multispectral image sensor 200 may be the same as or different from the processor 300. When the circuit portion included in the multispectral image sensor 200 is the same as the processor 300, the image acquisition device 100 may be the multispectral image sensor 200 itself, which may be implemented as an on-chip image sensor. In addition, even though the circuit portion included in the multispectral image sensor 200 may be different from the processor 300, when the processor 300 is arranged inside the multispectral image sensor 200, the image acquisition device 100 may be implemented as an on-chip image sensor. However, embodiments are not limited thereto. The processor 300 may be separately located outside the multispectral image sensor 200.

The processor 300 may acquire channel signals which may be output signals respectively corresponding to channels of the multispectral image sensor 200. The processor 300 may select at least some channels from among a number of channels physically provided in the multispectral image sensor 200 and acquire channel signals from the selected channels. For example, the processor 300 may acquire channel signals from all of the channels physically provided in the multispectral image sensor 200. In addition, the processor 300 may acquire channel signals by selecting only some channels from among the channels physically provided in the multispectral image sensor 200.

The processor 300 may also acquire number of channel signals which is different than the number of channel signals, by synthesizing or interpolating channel signals acquired from channels physically provided in the multispectral image sensor 200. For example, the processor 300 may acquire a decreased number of channel signals than the number of channel signals physically provided in the multispectral image sensor 200, by performing binning for pixels or channels of the multispectral image sensor 200. In addition, the processor 300 may acquire an greater number of channel signals than the number of channel signals physically provided in the multispectral image sensor 200, by generating new channel signals using interpolation.

When the number of acquired channel signals is decreased, each of the channel signals may correspond to a wide band such that sensitivity of each channel signal may increase and noise may decrease. In contrast, when the number of acquired channel signals is increased, a sensitivity of each of the channel signals may decrease to a certain degree, but more precise images may be acquired based on the plurality of channel signals. Accordingly, because there is a trade-off according to the increase or decrease in the number of acquired channel signals, the processor 300 may acquire an appropriate number of channel signals according to the application.

The processor 300 may perform basic image processing before or after an image or signal acquired by the multispectral image sensor 200 are stored in the memory. The basic image processing may include bad pixel correction, fixed pattern noise correction, crosstalk reduction, remosaicing, demosaicing, false color reduction, denoising, chromatic aberration correction, etc.

Figure 5:
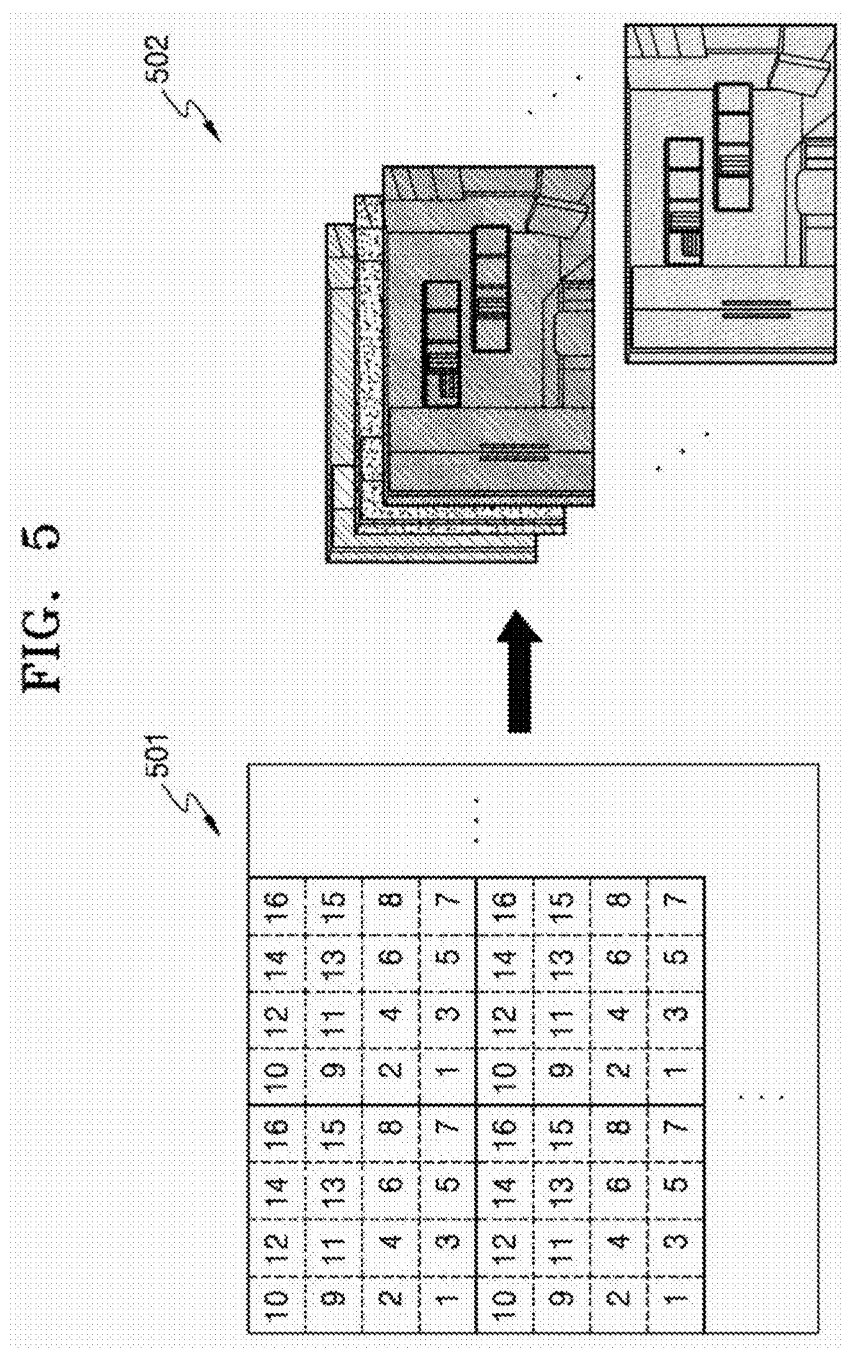
FIG. 5 is a diagram of a raw image acquired from the multispectral image sensor of FIG. 1 and images for each channel after demosaicing is performed, according to an embodiment.

The processor 300 may generate images for each channel by demosaicing channel signals, and may perform image processing on the image for channel. FIG. 5 is a diagram of a raw image 501 acquired from the multispectral image sensor 200 of FIG. 1, and images 502 for each channel after demosaicing is performed. In the raw image 501, one small square represents one pixel, and a number within the square represents a channel number. As identified from the channel number, the raw image 501 may be an image acquired by the multispectral image sensor 200 including 16 channels. The raw image 501 may include all pixels corresponding to different channels, but as pixels of the same channel are collected through demosaicing, the images 502 for each channel may be generated.

The multispectral image sensor 200 may acquire a multispectral image using four or more channels, or may acquire a hyperspectral image using nine or more channels. The multispectral image sensor 200 may acquire channel signals by selecting all or some of physically provided channels, and the processor 300 may adjust the number of channel signals to be acquired, by synthesizing or interpolating the acquired channel signals.

For example, the multispectral image sensor 200 may acquire the raw image 501 using a plurality of channels, and the processor 300 may generate the images 502 for each channel of the plurality of channels by demosaicing the acquired raw image 501.

Even though light corresponding to the same spectrum may be incident on the image acquisition device 100, different fixed pattern noise for each channel may be acquired by the multispectral image sensor 200. According to embodiments, fixed pattern noise may refer to a plane image including noise formed in a particular pattern due to the characteristics of the multispectral image sensor 200. According to embodiments, a plane image may refer to an image acquired with respect to an empty plane using the multispectral image sensor 200 in an environment where a specific illumination source exists.

The multispectral image sensor 200 may include a pixel array (e.g., the pixel array 65 in FIG. 3 and the pixel array 4100 in FIG. 4). The pixel array may include a plurality of pixels. The pixels of the multispectral image sensor 200 may be manufactured unevenly for each multispectral image sensor due to problems or limitations in a manufacturing process. Accordingly, the characteristics of pixels included in the multispectral image sensor 200 may be different for each multispectral image sensor.

For example, the multispectral image sensor 200 may include a pixel array having some defective pixels due to problems in the manufacturing process. As another example, the components (e.g., the semiconductor substrate 61 of FIG. 3) within the pixel of the multispectral image sensor 200 may be differently disposed for each multispectral image sensor due to limitations in the manufacturing process (e.g., errors occurring during the manufacturing process). Accordingly, the multispectral image sensor 200 may include pixels in which components within the pixels are somewhat differently disposed for each multispectral image sensor, even though the pixels may be provided at corresponding positions on the pixel array.

Because the characteristics of the pixels of the multispectral image sensor 200 are different for each multispectral image sensor, images of the same object acquired in the same environment by the multispectral image sensor 200 may also be different for each multispectral image sensor. Because the pixels of the multispectral image sensor 200 may be disposed at specific positions on the pixel array, distortions may be formed in a particular pattern in the images acquired by the multispectral image sensor 200.

The image acquisition device 100 may acquire an input image by performing registration on images for each channel of the multispectral image sensor 200 (e.g., the images 502 for each channel in FIG. 5). The multispectral image sensor 200 may acquire channel signals using four or more channels, and the processor 300 may generate images for each channel by performing demosaicing on the acquired channel signals. Because pixels corresponding to the channel of the multispectral image sensor 200 may be disposed in a specific pattern at specific positions on the filter array, distortions may be formed in a particular pattern in the images for each channel.

When spectrums of light incident on the image acquisition device 100 are different even though images are acquired by the same channel of the multispectral image sensor 200, different fixed pattern noise may be formed on the images acquired by the multispectral image sensor 200. For example, when wavelength ranges of light incident on the image acquisition device 100 is different, different fixed pattern noise may be formed on the images acquired by the multispectral image sensor 200. As another example, when wavelength shapes of light incident on the image acquisition device 100 are different, different fixed pattern noise may be formed on the images acquired by the multispectral image sensor 200.

When spectrums of light incident on the image acquisition device 100 are different, spectrums of light transmitted from the pixels of the multispectral image sensor 200 may be different. Accordingly, when spectrums of light incident on the image acquisition device 100 are different, different fixed pattern noise may be formed on the images acquired by the multispectral image sensor 200.

Figure 6A:
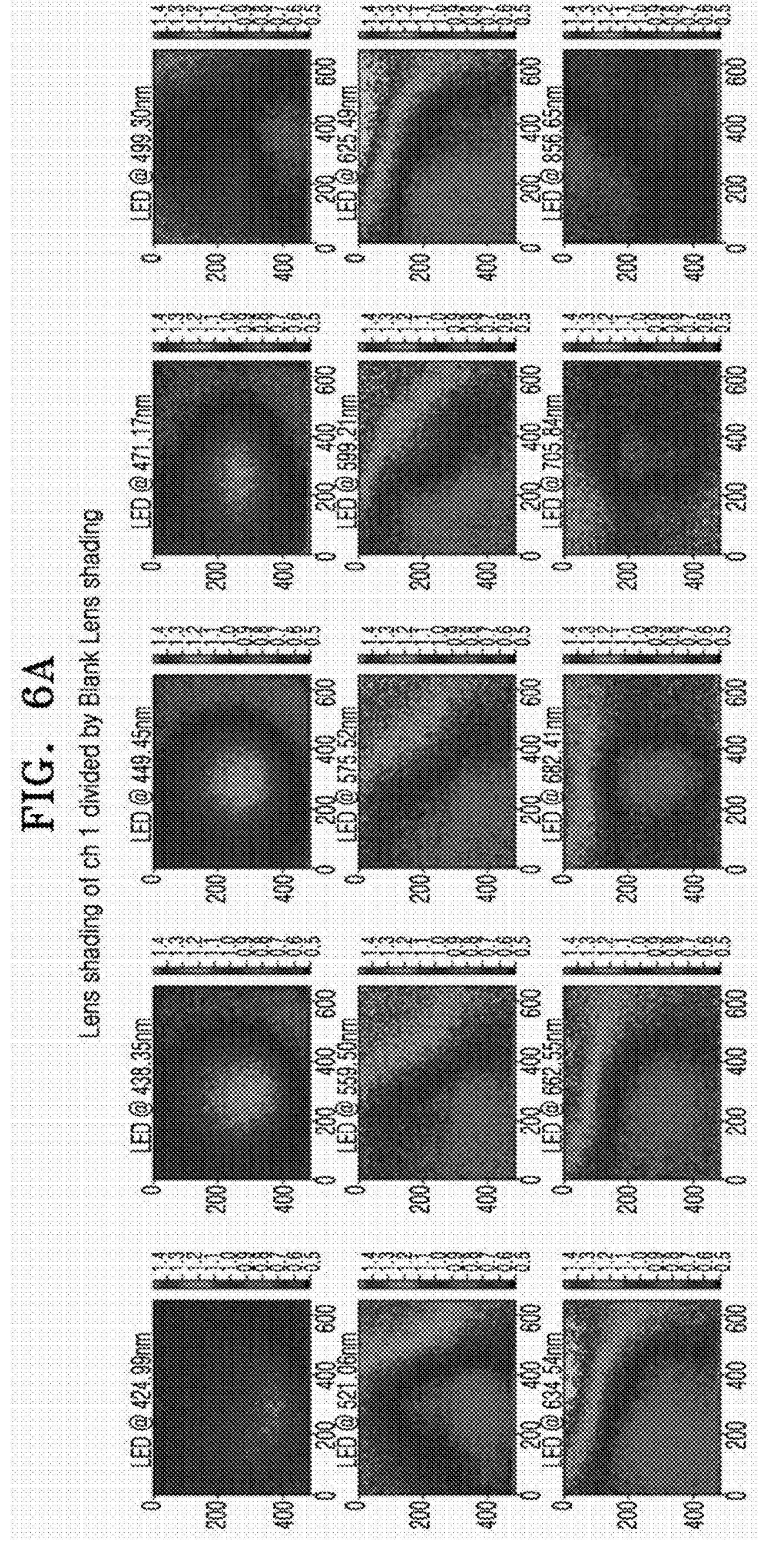
FIG. 6A is a diagram of fixed pattern noise according to a wavelength band with respect to an image of channel 1, according to an embodiment.
Figure 6B:
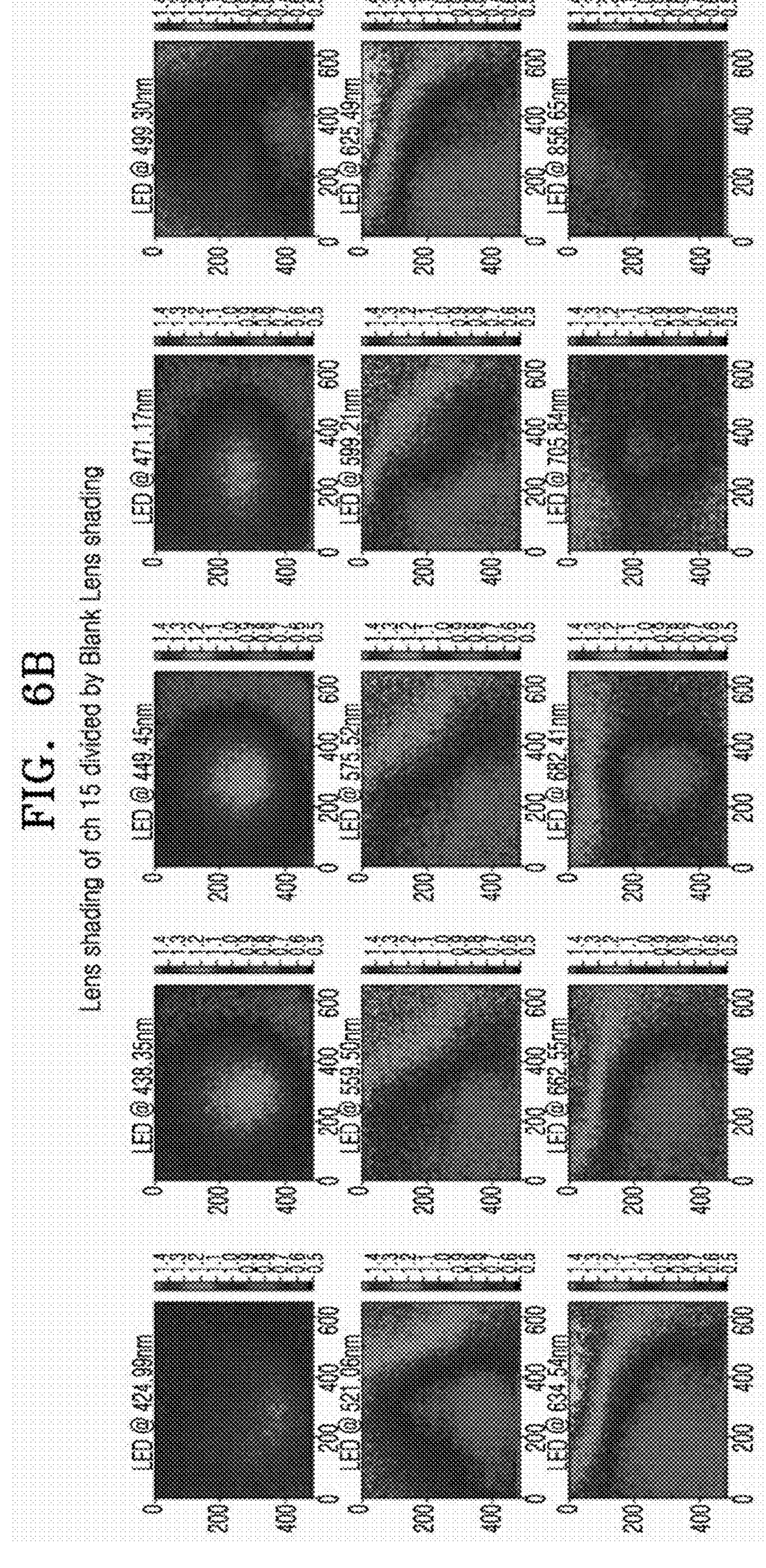
FIG. 6B is a diagram of fixed pattern noise according to a wavelength band with respect to an image of channel 15, according to an embodiment.

Different fixed pattern noise may be formed for each multispectral image sensor for each channel and wavelength range or shape. FIG. 6A is a diagram of fixed pattern noise according to a wavelength band with respect to an image of channel 1. FIG. 6B is a diagram of fixed pattern noise according to a wavelength band with respect to an image of channel 15. In the disclosure, the image of channel 1 and the image of channel 15 may respectively refer to the image of channel 1 generated by collecting pixels of channel 1, and the image of channel 15 generated by collecting pixels of channel 15, when the multispectral image sensor 200 includes 16 channels which are referred to as channel 1, channel 2, . . . , channel 15. Referring to FIGS. 6A and 6B, it may be seen that even though light of the same wavelength band (e.g., 424.99 nm) is incident on the image acquisition device 100, fixed pattern noise of channel 1 and fixed pattern noise of channel 15 are different from each other. Referring to FIG. 6A, when wavelength bands of light incident on the image acquisition device 100 are different (e.g., 424.99 nm and 438.35 nm), different fixed pattern noise may be formed on the image acquired by the multispectral image sensor 200 with respect to channel 1.

Distortion of the image acquired by the multispectral image sensor 200 may be appropriately calibrated. The image acquisition device 100 according to an embodiment may appropriately calibrate the image acquired by the multispectral image sensor 200 using previously stored fixed pattern noise.

Fixed pattern noise according to wavelength bands with respect to the channels of the multispectral image sensor 200 may be previously stored in a memory of the image acquisition device 100. However, embodiments are not limited thereto, and fixed pattern noise according to wavelength shapes with respect to the channels of the multispectral image sensor 200 may be previously stored in the memory of the image acquisition device 100.

For example, fixed pattern noise in a band of 400 nm with respect to channel 1 of the multispectral image sensor 200, fixed pattern noise in a band of 500 nm with respect to channel 1, fixed pattern noise in the band of 400 nm with respect to channel 2, and fixed pattern noise in the band of 500 nm with respect to channel 2 may be previously stored in the memory of the image acquisition device 100. Fixed pattern noise according to wavelength bands with respect to channel 3 to channel 16 may also be previously stored by using a similar method. As another example, fixed pattern noise in a first wavelength shape with respect to channel 1 of the multispectral image sensor 200, fixed pattern noise in a second wavelength shape with respect to channel 1, fixed pattern noise in the first wavelength shape with respect to channel 2, and fixed pattern noise in the second wavelength shape with respect to channel 2 may be previously stored in the memory of the image acquisition device 100. Fixed pattern noise according to wavelength shapes with respect to channel 3 to channel 16 may also be previously stored by using a similar method. However, embodiments are not limited thereto, and as another example, fixed pattern noise according to wavelength bands with respect to the channels of the multispectral image sensor 200 and fixed pattern noise according to wavelength shapes may be previously stored in the memory of the image acquisition device 100.

In order to reduce a storage space that the previously stored fixed pattern noise occupies in the memory of the image acquisition device 100, the fixed pattern noise may be stored in the memory after a technique of reducing storage capacity is applied to the fixed pattern noise. Techniques of reducing storage capacity may include down-sampling, quantization, compression, etc.

The processor 300 may detect a range or shape of a wavelength included in a spectrum of light incident on the image acquisition device 100 based on the image acquired by the multispectral image sensor 200. The processor 300 may receive fixed pattern noise for each of the channels corresponding to the detected range or shape of the wavelength from the memory.

When the technique of reducing storage capacity is applied to the fixed pattern noise stored in the memory, the processor 300 may receive the fixed pattern noise from the memory and then perform up-sampling and dequantization, decompression, etc. on the received fixed pattern noise.

The processor 300 may perform calibration on the image acquired by the multispectral image sensor 200 by subtracting the fixed pattern noise for each of the channels corresponding to the range or shape of the wavelength detected based on the image, from the images for each channel acquired by the multispectral image sensor 200.

The image acquisition device 100 according to an embodiment may perform appropriate calibration on the image using the previously stored fixed pattern noise, thereby securing spatial uniformity of the image acquired by the image acquisition device 100, and minimizing distortion of the image.

Figure 7:
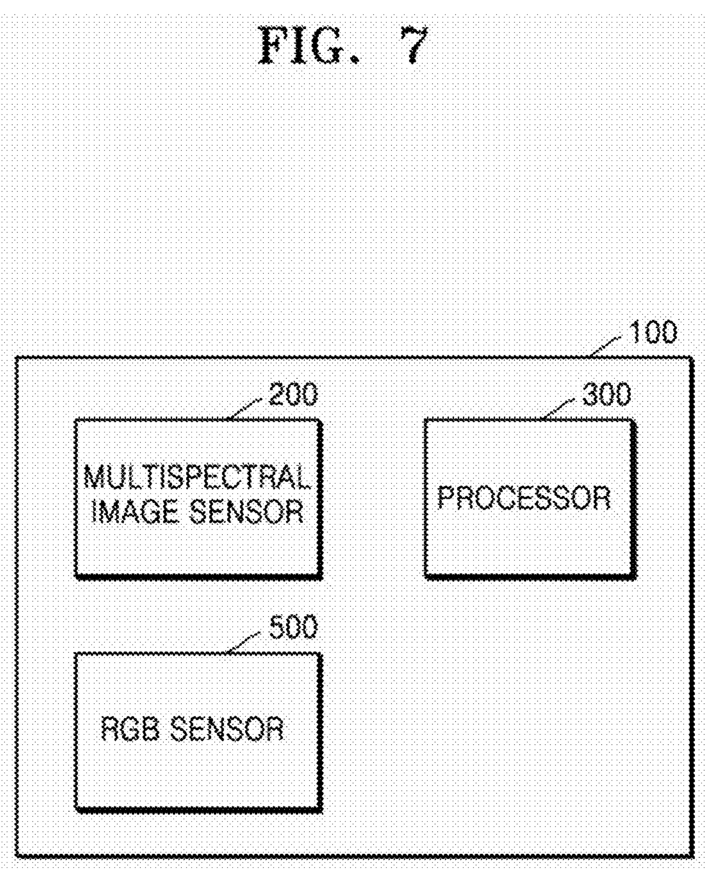
FIG. 7 is a block diagram of an image acquisition device according to an embodiment.

FIG. 7 is a block diagram of the image acquisition device 100 according to another embodiment. Referring to FIG. 7, the image acquisition device 100 may include the multispectral image sensor 200, the processor 300, and an RGB sensor 500. As shown in FIG. 7, the image acquisition device 100 may further include the RGB sensor 500, and redundant descriptions of other aspects of the image acquisition device 100 discussed above with reference to FIG. 1 are omitted below.

The multispectral image sensor 200 may acquire a first image through four or more channels. The processor 300 may perform basic image processing before or after the first image is stored in a memory. For example, the processor 300 may perform bad pixel correction, demosaicing, denoising, lens shading correction, etc. on the first image.

The RGB sensor 500 may acquire a second image through an R channel, a G channel, and a B channel. The processor 300 may perform basic image processing before or after the second image is stored in the memory. For example, the processor 300 may perform bad pixel correction, fixed pattern noise correction, demosaicing, denoising, lens shading correction, etc. on the second image.

Distortion of the first image acquired by the multispectral image sensor 200 may be appropriately calibrated. For example, the image acquisition device 100 may appropriately calibrate the first image acquired by the multispectral image sensor 200 based on the second image acquired by the RGB sensor 500.

Because the RGB sensor 500 may have fewer channels than the multispectral image sensor 200, a wavelength band corresponding to one channel of the RGB sensor 500 may be wider than a wavelength band of the multispectral image sensor 200. Accordingly, even though spectrums of light incident on the image acquisition device 100 may be different, fixed pattern noise formed on the second image acquired by the RGB sensor 500 may not differ significantly compared to fixed pattern noise of the multispectral image sensor 200. For example, noise of the second image acquired by the RGB sensor 500 may be reduced compared to the first image acquired by the multispectral image sensor 200.

Because the RGB sensor 500 may have fewer channels than the multispectral image sensor 200, a sensitivity of a channel signal corresponding to one channel of the RGB sensor 500 may be higher than a sensitivity of the multispectral image sensor 200.

The second image acquired by the RGB sensor 500 may have less noise than the first image acquired by the multispectral image sensor 200 and may be generated by channel signals with high sensitivity, and thus, the first image acquired by the multispectral image sensor 200 may be appropriately calibrated by using the second image acquired by the RGB sensor 500.

In order to calibrate the first image of the multispectral image sensor 200 using the second image of the RGB sensor 500, the processor 300 may perform registration on the first image of the multispectral image sensor 200 and the second image of the RGB sensor 500.

For example, the processor 300 may perform registration on the first image and the second image using affine transformation based on external factors of the multispectral image sensor 200 and the RGB sensor 500. The external factors may include at least one of positions, posture information, angles of view, and focal lengths of the multispectral image sensor 200 and the RGB sensor 500. The processor 300 may perform registration on the first image and the second image by translating or rotating the first image or the second image based on external factors of the multispectral image sensor 200 and the RGB sensor 500. In some embodiments, the processor 300 may perform registration on the first image and the second image by scaling the size of the first image or the size of the second image based on external factors of the multispectral image sensor 200 and the RGB sensor 500.

As another example, the processor 300 may perform registration on the first image and the second image using feature matching with respect to the first image of the multispectral image sensor 200 and the second image of the RGB sensor 500. The processor 300 may perform registration on the first image and the second image by comparing feature points of the first image with the feature points of the second image and matching the feature points located at corners of the first image with the feature points located at corners of the second image.

As another example, the processor 300 may calculate an optical flow between the first image of the multispectral image sensor 200 and the second image of the RGB sensor 500 and, based on the calculated optical flow, perform registration on the first image and the second image.

However, when performing registration on the first image and the second image, the above-described examples are merely divided for convenience of description, and registration on the first image and the second image may be performed through a combination of the above-described examples.

The processor 300 may perform registration on the second image of the RGB sensor 500 based on the first image of the multispectral image sensor 200, or may perform registration on the first image of the multispectral image sensor 200 based on the second image of the RGB sensor 500. However, embodiments are not limited thereto, and the processor 300 may simultaneously perform registration on the first image of the multispectral image sensor 200 and the second image of the RGB sensor 500.

The image acquisition device 100 may calibrate the first image acquired by the multispectral image sensor 200 based on the second image acquired by the RGB sensor 500. In some embodiments, the image acquisition device 100 may calibrate the first image on which registration is performed based on the second image on which registration is performed. In embodiments, the first image on which registration is performed may be referred to as a registered first image, and the second image on which registration is performed may be referred to as a registered second image.

The processor 300 may generate a guided image based on the second image acquired by the RGB sensor 500, and calibrate the first image acquired by the multispectral image sensor 200 based on the generated guided image. According to embodiments, the guided image may be an image referred to by the processor 300 in order to perform calibration on the image acquired by the multispectral image sensor 200. The guided image may be generated based on the second image acquired by the RGB sensor 500.

For example, the processor 300 may generate the guided image based on a channel signal corresponding to at least one of the R channel, the G channel, and the B channel of the RGB sensor 500. The processor 300 may generate the guided image based on at least one of an R channel signal corresponding to the R channel, a G channel signal corresponding to the G channel, and a B channel signal corresponding to the B channel.

According to an example, the processor 300 may generate an image acquired based on the R channel signal, the G channel signal, and the B channel signal as the guided image. According to another example, the processor 300 may generate an image acquired based on the G channel signal as the guided image.

As another example, the processor 300 may generate the guided image based on channel signals acquired by converting the R channel signal, the G channel signal, and the B channel signal into at least one color space of a YCbCr color space, an XYZ color space (e.g., an International Commission on Illumination (CIE) 1931 XYZ color space), and a Lab color space (e.g, a CIE 1976 L*a*b* color space). The processor 300 may generate the guided image based on at least one of the channel signals acquired by converting the R channel signal, the G channel signal, and the B channel signal into at least one color space of the YCbCr color space, the XYZ color space, and the an L*a*b* color space.

For example, the processor 300 may convert the R channel signal, the G channel signal, and the B channel signal into the YCbCr color space or the XYZ color space, and generate the guided image using a Y component corresponding to luminance among the converted channel signals. According to another example, the processor 300 may convert the R channel signal, the G channel signal, and the B channel signal into the an L*a*b* color space, and generate the guided image using an L* component corresponding to luminance among the converted channel signals. According to another example, the processor 300 may convert the R channel signal, the G channel signal, and the B channel signal into at least one color space of the YCbCr color space, the XYZ color space, and the L*a*b* color space, and generate the guided image using the Y component or the L* component as a main component and the remaining components as sub-components of the Y component or the L* component.

As another example, the processor 300 may generate three or more candidate guided images based on the R channel signal, the G channel signal, and the B channel signal, and, based on wavelength bands corresponding to the candidate guided images, select guided images respectively corresponding to the channels of the multispectral image sensor 200 from the candidate guided images.

According to an example, the processor 300 may generate three images acquired based on the R channel signal, the G channel signal, and the B channel signal, respectively, as the candidate guided images. The processor 300 may select a candidate guided image corresponding to a wavelength band closest to a wavelength band corresponding to each of the channels of the multispectral image sensor 200 from the candidate guided images as the guided image. According to another example, the processor 300 may generate, as the candidate guided images, three or more images acquired based on the R channel signal, the G channel signal, the B channel signal, and channel signals that are additionally acquired by synthesizing or interpolating the R channel signal, the G channel signal, and the B channel signal. The processor 300 may select a candidate guided image corresponding to a wavelength band closest to a wavelength band corresponding to each of the channels of the multispectral image sensor 200 from the candidate guided images as the guided image.

The processor 300 may calibrate the first image of the multispectral image sensor 200 using a guided image generated based on the second image. The second image used to generate the guided image may be an image acquired directly from the RGB sensor 500, or may be an image registered to the first image after acquired from the RGB sensor 500.

Before calibrating the first image of the multispectral image sensor 200 using the guided image, the processor 300 may transform the guided image based on properties of the multispectral image sensor 200.

The processor 300 may transform an entire region or a local region of the guided image based on the properties of the multispectral image sensor 200. The properties of the multispectral image sensor 200 may include at least one of resolution, dynamic range, and sharpness.

When resolutions of the guided image and the first image are different, the processor 300 may perform up sampling, down sampling, cropping, etc. on the guided image. When dynamic ranges of the guided image and the first image are different, the processor 300 may normalize the dynamic range of the guided image to the dynamic range of each of the images for each channel acquired by the multispectral image sensor 200. When sharpness of the guided image and sharpness of the first image are different, the processor 300 may cause the sharpness of the guided image to be similar to the sharpness of the first image by blurring or sharpening the guided image. In some embodiments, when the guided image is clearer than the first image, the processor 300 may cause the sharpness of the first image to be similar to the sharpness of the guided image, and, when the first image is clearer than the guided image, may cause the sharpness of the guided image to be similar to the sharpness of the first image.

The processor 300 may use the guided image generated based on the second image of the RGB sensor 500 in order to calibrate the first image of the multispectral image sensor 200. For example, the second image for generating the guided image may be an image acquired directly from the RGB sensor 500, or an image on which registration is performed with the first image of the multispectral image sensor 200 after acquired from the RGB sensor 500. In addition, the guided image may be an image generated based on the second image, or may be an image converted considering properties of the first image after generated based on the second image.

When an occlusion formed in the first image of the multispectral image sensor 200 and an occlusion formed in the second image of the RGB sensor 500 are different from each other, a region on which registration is impossible may occur. In some embodiments, when an angle of view of the multispectral image sensor 200 and an angle of view of the RGB sensor 500 are different from each other, the region on which registration is impossible may occur.

When the region on which registration is impossible occurs, the processor 300 may generate the guided image by extrapolating or interpolating the second image of the RGB sensor 500. For example, the processor 300 may generate the guided image by synthesizing or interpolating the channel signals acquired from the R channel, the G channel, and the B channel with respect to the second image acquired by the RGB sensor 500.

In some embodiments, when the region on which registration is impossible occurs, the processor 300 may not perform calibration on the first image based on the guided image generated based on the second image with respect to the region on which registration is impossible.

The image acquisition device 100 may perform registration on the guided image based on the first image. In some embodiments, the image acquisition device 100 may perform registration on the guided image that is converted based on the properties of the multispectral image sensor 200, based on the first image.

The processor 300 may perform registration on the guided image based on the images for each channel acquired by the multispectral image sensor 200. The images for each channel acquired by the multispectral image sensor 200 may be acquired using pixels provided at different positions on a pixel array. The processor 300 may perform registration on the guided image by translating the guided image based on the images for each channel acquired by the multispectral image sensor 200.

The image acquisition device 100 may perform calibration on the first image based on the guided image on which registration has been performed based on the first image. For example, the processor 300 may calibrate a first luminance change amount of the first image to be equal to a second luminance variation of the guided image on which registration has been performed. The processor 300 may detect a luminance of each of first pixels of the first image, and calculate the first luminance variation between adjacent pixels of the first pixels. The processor 300 may detect a luminance of each of second pixels of the guided image on which registration has been performed and calculate the second luminance variation between the adjacent second pixels. At this time, positions of the second pixels may respectively correspond to positions of the first pixels. For example, a first pixel from among the first pixels may correspond to a second pixel from among the second pixels, and a position of the first pixel within the first image may be similar to a position of a second pixel within the guided image on which registration has been performed (or any other second image). The processor 300 may calibrate the calculated first luminance variation of the first image to be equal to the calculated second luminance variation of the guided image on which registration has been performed.

As another example, the processor 300 may perform calibration on the first image using a guided filter. According to embodiments, a guided filter may refer to a filter that linearly processes the first image based on the guided image on which registration has been performed.

The image acquisition device 100 may perform appropriate calibration on the first image acquired by the multispectral image sensor 200 based on the second image acquired by the RGB sensor 500, thereby securing spatial uniformity of the first image acquired by the image acquisition device 100, and minimizing distortion of the first image.

The image acquisition device 100 may perform calibration on the first image acquired by the multispectral image sensor 200 based on the previously stored fixed pattern noise and the second image acquired by the RGB sensor 500.

For example, the image acquisition device 100 may perform calibration on the first image based on the previously stored fixed pattern noise, and may further perform calibration on the first image on which calibration has been performed based on the guided image generated based on the second image. In embodiments, the first image on which calibration has been performed may be referred to as a calibrated first image, but embodiments are not limited thereto.

The processor 300 may perform calibration on the first image based on the previously stored fixed pattern noise. The fixed pattern noise according to wavelength bands with respect to the channels of the multispectral image sensor 200 may be previously stored in the memory of the image acquisition device 100. However, embodiments are not limited thereto, and the fixed pattern noise according to wavelength shapes with respect to the channels of the multispectral image sensor 200 may be previously stored in the memory of the image acquisition device 100. The processor 300 may detect a range or a shape of a wavelength included in the spectrum of light incident on the image acquisition device 100 based on the image acquired by the multispectral image sensor 200. The processor 300 may receive fixed pattern noise for each of the channels corresponding to the detected range or shape of the wavelength from the memory. The processor 300 may subtract the fixed pattern noise for each of the channels corresponding to the range or shape of the wavelength detected based on the image from the images for each channel acquired by the multispectral image sensor 200, thereby performing calibration on the first image acquired by the multispectral image sensor 200.

The processor 300 may further perform calibration on the calibrated first image based on the guided image generated based on the second image. For example, the processor 300 may generate the guided image based on the second image acquired by the RGB sensor 500, and may further calibrate the calibrated first image based on the generated guided image.

As another example, the image acquisition device 100 may obtain a weighted sum based on a first correction image generated by performing calibration on the first image based on the previously stored fixed pattern noise, and a second correction image generated by performing calibration on the first image based on the guided image generated based on the second image.

The processor 300 may generate the first correction image by performing calibration on the first image based on the previously stored fixed pattern noise. The processor 300 may detect a range or shape of a wavelength included in the spectrum of light incident on the image acquisition device 100 based on the first image, and receive fixed pattern noise for each of the channels corresponding to the detected range or shape of the wavelength from the memory. The processor 300 may generate the first correction image by subtracting the fixed pattern noise for each of the channels corresponding to the range or shape of the wavelength detected based on the image from the images for each channel acquired by the multispectral image sensor 200.

The processor 300 may generate the second correction image by performing calibration on the first image based on the guided image generated based on the second image. The processor 300 may generate the second correction image by generating the guided image based on the second image acquired by the RGB sensor 500, and performing calibration on the first image based on the generated guided image.

The processor 300 may perform calibration on the first image by obtaining the weighted sum of the first correction image and the second correction image.

As another example, the image acquisition device 100 may perform calibration on the first image acquired by the multispectral image sensor 200 based on the second image acquired by the RGB sensor 500, and, when there is region on which registration, perform calibration on the first image acquired by the multispectral image sensor 200 based on the previously stored fixed pattern noise with respect to the region on which registration is impossible.

The image acquisition device 100 may perform appropriate calibration on the first image acquired by the multispectral image sensor 200 based on the previously stored fixed pattern noise and the second image acquired by the RGB sensor 500, thereby securing spatial uniformity of the first image acquired by the image acquisition device 100, and minimizing distortion of the first image.

The image acquisition device 100 may perform calibration on the first image by inputting the first image of the multispectral image sensor 200 and the second image of the RGB sensor 500 to a previously trained deep learning network.

The processor 300 may perform calibration on the first image by inputting the first image and the second image themselves to the previously trained deep learning network. In some embodiments, the processor 300 may perform calibration on the first image by inputting the first image and the second image on which basic image processing has been performed to the deep learning network.

The deep learning network may be previously trained using one or more pairs of first images and second images, and may include previously determined network parameters based on the one or more pairs of first images and second images.

The deep learning network may be trained using, as a loss function, an error based on the first image and the first image on which calibration has been performed (e.g., the calibrated first image). For example, the deep learning network may use an error between the first image and the calibrated first image generated based on the previously stored fixed pattern noise. As another example, the deep learning network may use an error between the first image and the calibrated first image generated based on the guided image. As another example, the deep learning network may use an error between the first image and the calibrated first image generated based on the previously stored fixed pattern noise and the guided image.

The deep learning network may use the sum of mean squared errors or the sum of absolute errors as the error. However, embodiments are not limited thereto, and the deep learning network may use a weighted sum of two or more error values as the error.

The deep learning network may include a convolutional layer. In some embodiments, the deep learning network may include some layers of a transformer including an encoder and a decoder. However, embodiments are not limited thereto. As an example, the deep learning network may include a U-net architecture configured in a U shape, and, as another example, may use a generative network.

The image acquisition device 100 may perform appropriate calibration on the first image acquired by the multispectral image sensor 200 using the deep learning network, thereby securing spatial uniformity of the first image acquired by the image acquisition device 100, and minimizing distortion of the first image.

Figure 8:
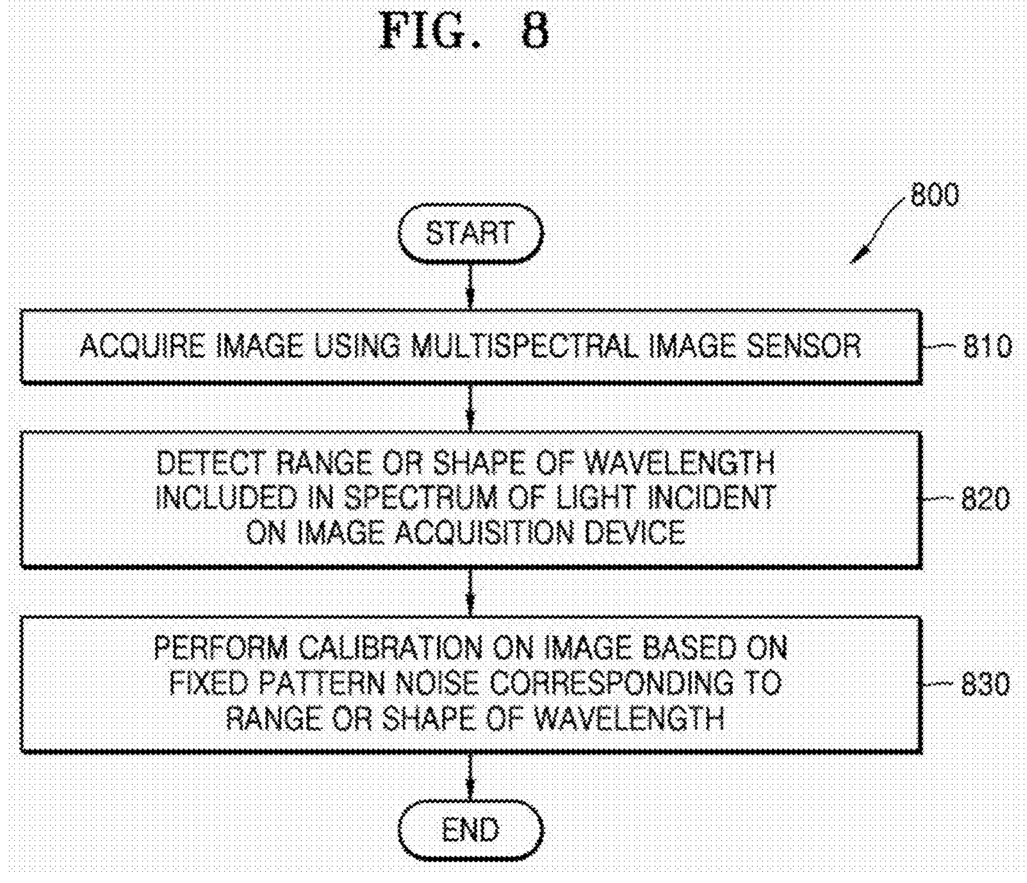
FIG. 8 is a flowchart for explaining a method of acquiring an image, according to an embodiment.

FIG. 8 is a flowchart for explaining a method of acquiring an image according to an embodiment. Referring to FIG. 8, a process 800 of acquiring the image according to an embodiment may include operations processed by the image acquisition device 100 described with reference to FIG. 1. Accordingly, descriptions of the image acquisition device 100 given with reference to FIG. 1 may also be applied to the method of acquiring the image of FIG. 8.

The process 800 may start at operation 810 by acquiring the image using the multispectral image sensor 200. The multispectral image sensor 200 may acquire the image using four or more channels. The processor 300 may perform basic image processing before or after the image is stored in a memory. For example, the processor 300 may perform bad pixel correction, demosaicing, denoising, lens shading correction, etc. on the image.

At operation 820, the image acquisition device 100 may detect a range or shape of a wavelength included in a spectrum of light incident on the image acquisition device 100. The processor 300 may detect the range or shape of the wavelength included in the spectrum of light incident on the image acquisition device 100 based on the image acquired by the multispectral image sensor 200.

At operation 830, the image acquisition device 100 may perform calibration on the image based on fixed pattern noise corresponding to the detected range or shape of the wavelength.

Fixed pattern noise according to wavelength bands with respect to channels of the multispectral image sensor 200 may be previously stored in the memory of the image acquisition device 100. However, embodiments are not limited thereto, and fixed pattern noise according to wavelength shapes with respect to the channels of the multispectral image sensor 200 may be previously stored in the memory of the image acquisition device 100.

For example, fixed pattern noise in a band of 400 nm with respect to channel 1 of the multispectral image sensor 200, fixed pattern noise in a band of 500 nm with respect to channel 1, fixed pattern noise in the band of 400 nm with respect to channel 2, and fixed pattern noise in the band of 500 nm with respect to channel 2 may be previously stored in the memory of the image acquisition device 100. Fixed pattern noise according to wavelength bands with respect to channel 3 to channel 16 may also be previously stored using a similar method. As another example, fixed pattern noise in a first wavelength shape with respect to channel 1 of the multispectral image sensor 200, fixed pattern noise in a second wavelength shape with respect to channel 1, fixed pattern noise in the first wavelength shape with respect to channel 2, and fixed pattern noise in the second wavelength shape with respect to channel 2 may be previously stored in the memory of the image acquisition device 100. Fixed pattern noise according to wavelength shapes with respect to channel 3 to channel 16 may also be previously stored using a similar method.

In order to reduce a storage space occupied by the previously stored fixed pattern noise in the memory of the image acquisition device 100, the fixed pattern noise may be stored in the memory after a technique of reducing storage capacity is applied to the fixed pattern noise. Techniques for reducing storage capacity may include down-sampling, quantization, compression, etc.

The processor 300 may receive fixed pattern noise for each of the channels corresponding to the detected range or shape of the wavelength from the memory. When the technique of reducing storage capacity is applied to the fixed pattern noise stored in the memory, the processor 300 may receive the fixed pattern noise from the memory and then perform up-sampling and dequantization, decompression, etc. on the received fixed pattern noise.

The processor 300 may perform calibration on the image acquired by the multispectral image sensor 200 by subtracting the fixed pattern noise for each of the channels corresponding to the range or shape of the wavelength detected based on the image, from images for each channel acquired by the multispectral image sensor 200.

The method of acquiring the image according to an embodiment may perform appropriate calibration on the image using the previously stored fixed pattern noise, thereby securing spatial uniformity of the image acquired by the image acquisition device 100, and minimizing distortion of the image.

Figure 9:
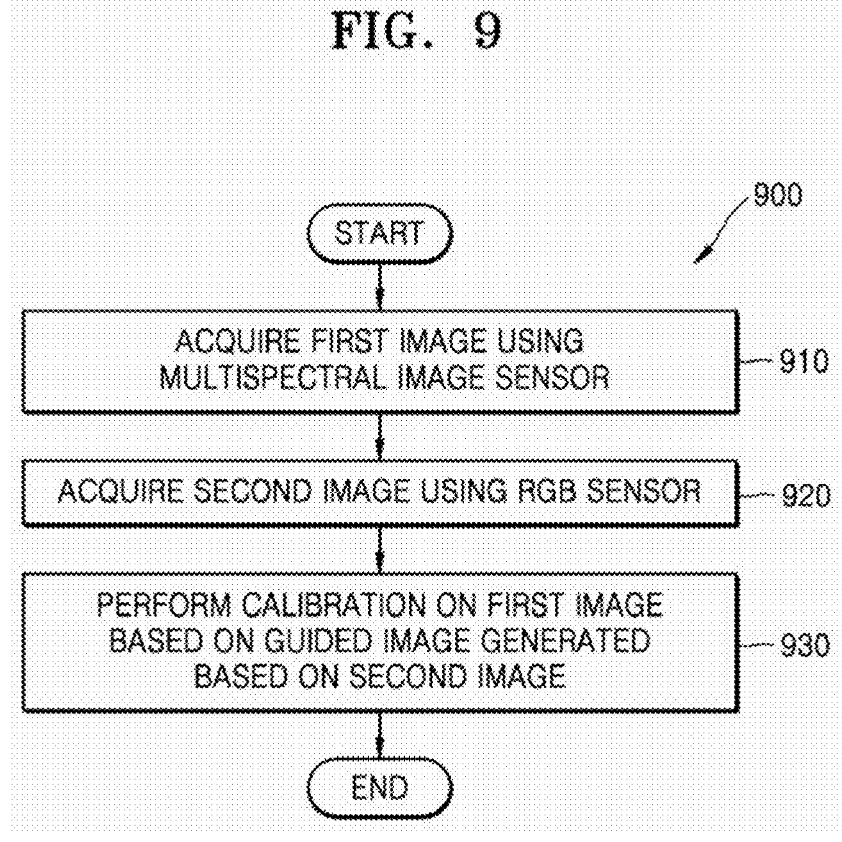
FIG. 9 is a flowchart for explaining a method of acquiring an image, according to an embodiment.

FIG. 9 is a flowchart for explaining a method of acquiring an image according to another embodiment. Referring to FIG. 9, a process 900 of acquiring the image according to another embodiment include operations processed by the image acquisition device 100 described with reference to FIG. 7. Accordingly, descriptions of the image acquisition device 100 given with reference to FIG. 7 may also be applied to the method of acquiring the image of FIG. 9.

At operation 910, a first image may be acquired using the multispectral image sensor 200. The multispectral image sensor 200 may acquire the first image using four or more channels. The processor 300 may perform basic image processing before or after the first image is stored in a memory. For example, the processor 300 may perform bad pixel correction, demosaicing, denoising, lens shading correction, etc. on the first image.

At operation 920, a second image may be acquired using the RGB sensor 500. The RGB sensor 500 may acquire the second image through a R channel, a G channel, and a B channel. The processor 300 may perform basic image processing before or after the second image is stored in the memory. For example, the processor 300 may perform bad pixel correction, demosaicing, denoising, lens shading correction, etc. on the second image.

At operation 930, the image acquisition device 100 may perform calibration on the first image acquired by the multispectral image sensor 200 based on a guided image generated based on the second image acquired by the RGB sensor 500. Hereinafter, an example of a method, performed by the image acquisition device 100, of calibrating the first image based on the second image is described in detail below with reference to FIG. 10.

Figure 10:
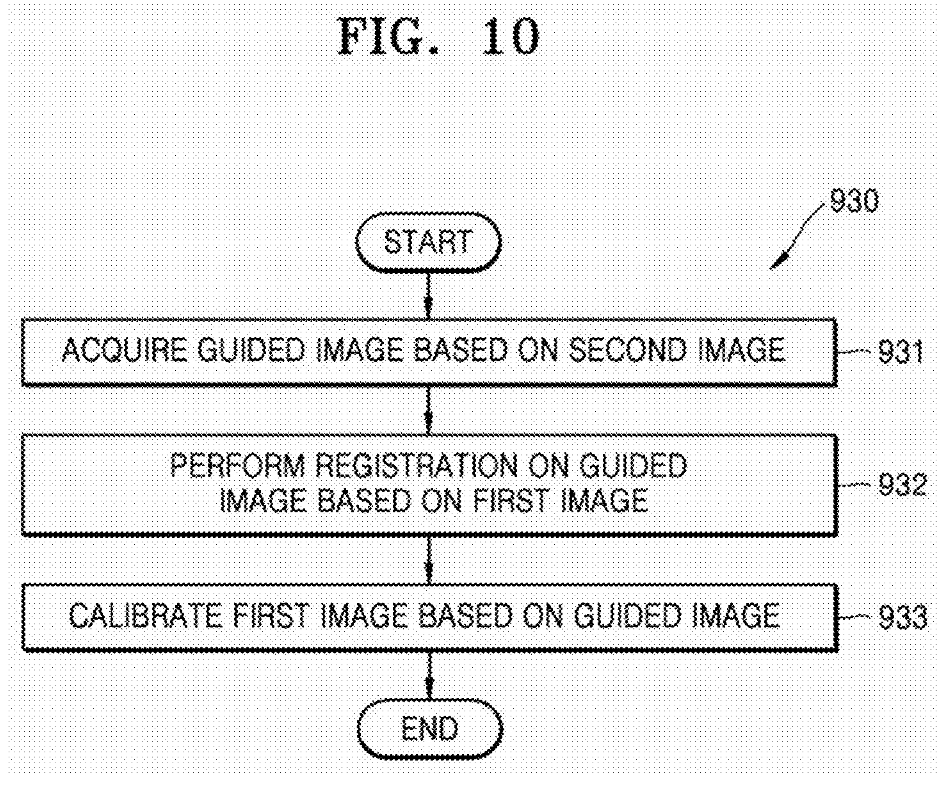
FIG. 10 is a flowchart for explaining operation 930 of FIG. 9, according to an embodiment.

FIG. 10 is a flowchart for specifically explaining an example of operation 930 of FIG. 9.

At operation 931, the image acquisition device 100 may generate a guided image based on a second image. According to embodiments, the second image for generating the guided image may be an image acquired directly from the RGB sensor 500, or an image on which registration is performed with a first image of the multispectral image sensor 200 after acquired from the RGB sensor 500.

The processor 300 may perform registration on the first image and the second image before generating the guided image. The processor 300 may perform registration on the first image of the multispectral image sensor 200 and the second image of the RGB sensor 500.

For example, the processor 300 may perform registration on the first image and the second image using affine transformation based on external factors of the multispectral image sensor 200 and the RGB sensor 500. The external factor may include at least one of positions, posture information, angles of view, and focal lengths of the multispectral image sensor 200 and the RGB sensor 500. The processor 300 may perform registration on the first image and/or the second image by translating or rotating the first image and/or the second image or scaling the size of the first image or the size of the second image, based on external factors of the multispectral image sensor 200 and the RGB sensor 500.

As another example, the processor 300 may perform registration on the first image and the second image using feature matching with respect to the first image of the multispectral image sensor 200 and the second image of the RGB sensor 500. The processor 300 may perform registration on the first image and the second image by comparing feature points of the first image the feature points of the second image and matching the feature points located at corners of the first image with the feature points located at corners of the second image.

As another example, the processor 300 may calculate an optical flow between the first image of the multispectral image sensor 200 and the second image of the RGB sensor 500 and, based on the calculated optical flow, perform registration on the first image and the second image.

However, when performing registration on the first image and the second image, the above-described examples are provided merely for convenience of description, and registration on the first image and the second image may be performed through a combination of the above-described examples or by any other method.

The processor 300 may generate a guided image based on the second image acquired by the RGB sensor 500 or the second image on which registration is performed with the first image.

For example, the processor 300 may generate the guided image based on a channel signal corresponding to at least one of a R channel, a G channel, and a B channel of the RGB sensor 500. The processor 300 may generate an image acquired based on all of the R channel signal, the G channel signal, and the B channel signal as the guided image, or may generate an image acquired based on only one of the R channel signal, the G channel signal, and the B channel signal as the guided image.

For example, the processor 300 may generate the guided image based on channel signals acquired by converting the R channel signal, the G channel signal, and the B channel signal into at least one color space of a YCbCr color space, an XYZ color space, and a an L*a*b* color space. The processor 300 may generate the guided image using a Y component corresponding to luminance among the channel signals converted to the YCbCr color space or the XYZ color space, or an L* component corresponding to luminance among the channel signals converted to the an L*a*b* color space. In some embodiments, the processor 300 may generate the guided image using the Y component or the L* component as a main component and the remaining components as sub-components of the Y component or the L* component.

For example, the processor 300 may generate three or more candidate guided images based on the R channel signal, the G channel signal, and the B channel signal, and, based on wavelength bands corresponding to the candidate guided images, select guided images respectively corresponding to the channels of the multispectral image sensor 200 from the candidate guided images.

The processor 300 may generate three images respectively acquired based on the R channel signal, the G channel signal, and the B channel signal as the candidate guided images. However, embodiments are not limited thereto, and the processor 300 may generate, as the candidate guided images, three or more images acquired based on the R channel signal, the G channel signal, the B channel signal, and channel signals that are additionally acquired by synthesizing or interpolating the R channel signal, the G channel signal, and the B channel signal. The processor 300 may select a candidate guided image corresponding to a wavelength band closest to a wavelength band corresponding to each of the channels of the multispectral image sensor 200 from the candidate guided images as the guided image.

At operation 931, the image acquisition device 100 may generate the guided image and then transform an entire region or a local region of the guided image based on properties of the multispectral image sensor 200. The properties of the multispectral image sensor 200 may include at least one of resolution, dynamic range, and sharpness.

When resolutions of the guided image and the first image are different, the processor 300 may perform up sampling, down sampling, cropping, etc. on the guided image, and when dynamic ranges of the guided image and the first image are different, normalize the dynamic range of the guided image to the dynamic range of each of the images for each channel acquired by the multispectral image sensor 200. When sharpness of the guided image and sharpness of the first image are different, the processor 300 may cause the sharpness of the guided image to be similar to the sharpness of the first image by further blurring or sharpening the guided image. In some embodiments, when the guided image is clearer than the first image, the processor 300 may cause the sharpness of the first image to be similar to the sharpness of the guided image, and, when the first image is clearer than the guided image, cause the sharpness of the guided image to be similar to the sharpness of the first image.

When an occlusion formed in the first image of the multispectral image sensor 200 and an occlusion formed in the second image of the RGB sensor 500 are different from each other, or when an angle of view of the multispectral image sensor 200 and an angle of view of the RGB sensor 500 are different from each other, a region on which registration is impossible may occur.

When the region on which registration is impossible occurs, the processor 300 may generate the guided image by extrapolating or interpolating the second image of the RGB sensor 500. For example, the processor 300 may generate the guided image by synthesizing or interpolating the channel signals acquired from the R channel, the G channel, and the B channel with respect to the second image acquired by the RGB sensor 500. In some embodiments, when the region on which registration is impossible occurs, in operation 933, which is described below, the processor 300 may not perform calibration on the first image based on the guided image generated based on the second image with respect to the region on which registration is impossible.

At operation 932, the image acquisition device 100 may perform registration on the guided image based on the first image. The processor 300 may perform registration on the guided image based on the images for each channel acquired by the multispectral image sensor 200. The images for each channel acquired by the multispectral image sensor 200 may be acquired using pixels provided at different positions on a pixel array. The processor 300 may perform registration on the guided image by translating the guided image based on the images for each channel acquired by the multispectral image sensor 200.

At operation 933, the image acquisition device 100 may calibrate the first image based on the guided image.

For example, the processor 300 may calibrate a first luminance variation of the first image to be equal to a second luminance variation of the guided image on which registration has been performed. The processor 300 may detect a luminance of each of first pixels of the first image and calculate the first luminance variation between adjacent pixels of the first pixels. The processor 300 may detect a luminance of each of second pixels of the guided image on which registration has been performed and calculate the second luminance variation between adjacent pixels of the second pixels. According to embodiments, positions of the second pixels may respectively correspond to positions of the first pixels. The processor 300 may calibrate the calculated first luminance variation of the first image to be equal to the calculated second luminance variation of the guided image on which registration has been performed. However, embodiments are not limited thereto, and, as another example, the processor 300 may perform calibration on the first image using a guided filter.

The image acquisition device 100 may perform appropriate calibration on the first image acquired by the multispectral image sensor 200 based on the second image acquired by the RGB sensor 500, thereby securing spatial uniformity of the first image acquired by the image acquisition device 100, and minimizing distortion of the first image.

The processor 300 may perform calibration on the first image acquired by the multispectral image sensor 200 based on the previously stored fixed pattern noise and the guided image.

For example, the image acquisition device 100 may perform calibration on the first image based on the previously stored fixed pattern noise to obtain a calibrated first image, and may further perform calibration on the calibrated first image based on the guided image.

The processor 300 may perform calibration on the first image based on the previously stored fixed pattern noise. The fixed pattern noise according to wavelength bands and/or the fixed pattern noise according to wavelength shapes with respect to the channels of the multispectral image sensor 200 may be previously stored in the memory of the image acquisition device 100. The processor 300 may detect a range or shape of a wavelength included in a spectrum of light incident on the image acquisition device 100 based on the first image. The processor 300 may receive fixed pattern noise for each of the channels corresponding to the detected range or shape of the wavelength from the memory.

The processor 300 may subtract the fixed pattern noise for each of the channels corresponding to the range or shape of the wavelength detected based on the image from the images for each channel acquired by the multispectral image sensor 200, thereby performing calibration on the first image acquired by the multispectral image sensor 200 to obtain a calibrated first image. The processor 300 may further perform calibration on the calibrated first image based on the guided image.

For example, the processor 300 may perform a weighted sum on, or obtain a weighted sum of, a first correction image generated by performing calibration on the first image based on the previously stored fixed pattern noise and a second correction image generated by performing calibration on the first image based on the guided image generated based on the second image. The processor 300 may generate the first correction image by performing calibration on the first image based on the previously stored fixed pattern noise. The processor 300 may generate the second correction image by performing calibration on the first image based on the guided image. The processor 300 may perform or obtain the weighted sum based on the first correction image and the second correction image.

For example, the processor 300 may perform calibration on the first image acquired by the multispectral image sensor 200 based on the second image acquired by the RGB sensor 500, and, when there is a region on which registration is impossible, may perform calibration on the first image acquired by the multispectral image sensor 200 based on the previously stored fixed pattern noise with respect to the region on which registration is impossible.

The method of acquiring the image according to another embodiment may perform appropriate calibration on the first image acquired by the multispectral image sensor 200 based on the previously stored fixed pattern noise and the second image acquired by the RGB sensor 500, thereby securing spatial uniformity of the first image acquired by the image acquisition device 100, and minimizing distortion of the first image.

The processor 300 may perform calibration on the first image by inputting the first image of the multispectral image sensor 200 and the second image of the RGB sensor 500 to a previously trained deep learning network.

The processor 300 may perform calibration on the first image by providing the first image and the second image as inputs to the previously trained deep learning network. In some embodiments, the processor 300 may perform calibration on the first image by inputting the first image and the second image on which basic image processing has been performed to the previously trained deep learning network.

The deep learning network may be previously trained using one or more pairs of first images and second images, and may include previously determined network parameters which were generated using or based on the one or more pairs of first images and images.

The deep learning network may be previously trained using, as a loss function, an error based on the first image and the first image on which calibration has been performed. For example, the error may be determined based on the first image and the calibrated first image generated based on the previously stored fixed pattern noise. As another example, the error may be determined based on the first image and the calibrated first image generated based on the guided image. As another example, the error may be determined based on the first image and the calibrated first image generated based on the previously stored fixed pattern noise and on the guided image.

The deep learning network may use the sum of mean squared errors or the sum of absolute errors as the error. However, embodiments are not limited thereto, and the deep learning network may use a weighted sum of two or more error values as the error.

The deep learning network may include a convolutional layer. In some embodiments, the deep learning network may include some layers of a transformer including an encoder and a decoder. However, embodiments are not limited thereto, and, for example, the deep learning network may include a U-net architecture configured in a "U" shape, and, as another example, use a generative network.

The method of acquiring the image according to embodiments may include performing appropriate calibration on the first image acquired by the multispectral image sensor 200 using the deep learning network, thereby securing spatial uniformity of the first image acquired by the image acquisition device 100, and minimizing distortion of the first image.

According to embodiments, the methods and processes performed above may be recorded on a computer-readable non-transitory recording medium having recorded thereon one or more programs including instructions that execute the method. Examples of a computer-readable recording medium include a magnetic medium such as a hard disk, a floppy disk, or a magnetic tape, an optical medium such as a CD-ROM or a digital video disc (DVD), a magneto-optical medium such as a floptical disk, and a hardware device specially configured to store and execute program commands, such as ROM, RAM, or flash memory. Examples of the program commands include high-level language code that may be executed by a computer using an interpreter or the like as well as machine language code made by a compiler.

FIG. 11 is a block diagram showing a configuration of an electronic device according to an embodiment.

Referring to FIG. 11, in a network environment ED00, the electronic device ED01 may communicate with another electronic device ED02 via a first network ED98 (e.g., a short-range wireless communication network, etc.), or may communicate with another electronic device ED04 and/or a server ED08 via a second network ED99 (e.g., long-range wireless communication network, etc.) The electronic device ED01 may communicate with the electronic device ED04 via the server ED08. The electronic device ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some of the components (e.g., display device ED60, etc.) may be omitted or another component may be added. Some of the components may be configured as one integrated circuit. For example, the sensor module ED76 (e.g., a fingerprint sensor, an iris sensor, an illuminance sensor, etc.) may be embedded and implemented in the display device ED60 (e.g., a display, etc.) In addition, when an image sensor (e.g., the multispectral image sensor 200 of FIG. 1 and the RGB sensor 500 of FIG. 7) includes a spectral function, some functions of the sensor module (e.g., color sensor, illuminance sensor) may be implemented in the image sensor itself rather than in a separate sensor module.

The processor ED20 may be, for example, the processor 300 of FIGS. 1 and 7. The processor ED20 may control one or more components (e.g., hardware, software components, etc.) of the electronic device ED01 connected to the processor ED20 by executing software (program ED40, etc.), and may perform various data processes or operations. As a part of the data processing or operations, the processor ED20 may load a command and/or data received from another component (e.g., the sensor module ED76, the communication module ED90, etc.) to a volatile memory ED32, may process the command and/or data stored in the volatile memory ED32, and may store result data in a non-volatile memory ED34. The processor ED20 may include a main processor ED21 (e.g., a central processing unit, an application a processor, etc.) and an auxiliary processor ED23 (e.g., a graphic processing unit, an image signal processor, a sensor hub processor, a communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (e.g., a sleep state) or along with the main processor ED21 while the main processor ED21 is in an active state (e.g., an application executed state), may control functions and/or states related to some of the components (e.g., the display device ED60, sensor module ED76, the communication module ED90, etc.) in the electronic device ED01. The auxiliary processor ED23 (e.g., an image signal processor, a communication processor, etc.) may be implemented as a part of another component (e.g., the camera module ED80, the communication module ED90, etc.) that is functionally related thereto.

The memory ED30 may store various data required by the components (e.g., the processor ED20, the sensor module ED76, etc.) of the electronic device ED01. The data may include, for example, input data and/or output data about software (e.g., the program ED40, etc.) and commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored as software in the memory ED30, and may include an operation system ED42, middleware ED44, and/or an application ED46.

The input device ED50 may receive commands and/or data to be used in the components (e.g., the processor ED20, etc.) of the electronic device ED01, from outside (e.g., a user, etc.) of the electronic device ED01. The input device ED50 may include a microphone, a mouse, a keyboard, and/or a digital pen (e.g., a stylus pen).

The sound output device ED55 may output a sound signal to outside of the electronic device ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic device ED01. The display device ED60 may include a display, a hologram device, or a projector, and a control circuit for controlling the corresponding device. The display device ED60 may include a touch circuitry set or configured to sense a touch, and/or a sensor circuit (e.g., a pressure sensor, etc.) that is set or configured to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic device (e.g., the electronic device ED02, etc.) connected directly or wirelessly to the electronic device ED01.

The sensor module ED76 may sense an operating state (e.g., power, temperature, etc.) of the electronic device ED01, or an outer environmental state (user state, etc.), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic device ED01 to be directly or wirelessly connected to another electronic device (e.g., the electronic device ED02, etc.) The interface ED77 may include a high-definition multimedia interface (HDMI), a universal serial bus (USB) interface, an SD card interface, and/or an audio interface.

The connection terminal ED78 may include a connector by which the electronic device ED01 may be physically connected to another electronic device (e.g., the electronic device ED02, etc.). The connection terminal ED78 may include an HDMI connector, a USB connector, an SD card connector, and/or an audio connector (headphone connector, etc.).

The haptic module ED79 may convert the electrical signal into a mechanical stimulation (e.g., vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include the image acquisition device 100 described above, an additional lens assembly, image signal processors, and/or flashes. The lens assembly included in the camera module ED80 may collect light emitted from a subject that is an object to be captured.

The power management module ED88 may manage the power supplied to the electronic device ED01. The power management module ED88 may be implemented as a part of a power management integrated circuit (PMIC).

The battery ED89 may supply electric power to components of the electronic device ED01. The battery ED89 may include a primary battery that is not rechargeable, a secondary battery that is rechargeable, and/or a fuel cell.

The communication module ED90 may support the establishment of a direct (e.g., wired) communication channel and/or a wireless communication channel between the electronic device ED01 and another electronic device (e.g., the electronic device ED02, the electronic device ED04, the server ED08, etc.), and execution of communication through the established communication channel. The communication module ED90 may be operated independently from the processor ED20 (e.g., an application processor, etc.), and may include one or more communication processors that support the direct communication and/or the wireless communication. The communication module ED90 may include a wireless communication module ED92 (e.g., a cellular communication module, a short-range wireless communication module, a global navigation satellite system (GNSS) communication module) and/or a wired communication module ED94 (e.g., a local area network (LAN) communication module, a power line communication module, etc.) From among the communication modules, a corresponding communication module may communicate with another electronic device via a first network ED09 (short-range communication network such as Bluetooth, WiFi direct, or infrared data association (IrDA)) or a second network ED99 (e.g., a long-range communication network such as a cellular network, Internet, or computer network (e.g., LAN, WAN, etc.)). Such above various kinds of communication modules may be integrated as one component (e.g., a single chip, etc.) or may be implemented as a plurality of components (e.g., a plurality of chips) separately from one another. The wireless communication module ED92 may identify and authenticate the electronic device ED01 in a communication network such as the first network ED98 and/or the second network ED99 using subscriber information (e.g., an international mobile subscriber identifier (IMSI), etc.) stored in the subscriber identification module ED96.

The antenna module ED97 may transmit or receive the signal and/or power to/from outside (e.g., another electronic device, etc.) An antenna may include a radiator formed as a conductive pattern formed on a substrate (e.g., a printed circuit board (PCB), etc.). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic device via the selected antenna. Another component (e.g., a radio-frequency integrated circuit (RFIC), etc.) other than the antenna may be included as a part of the antenna module ED97.

Some of the components may be connected to one another via the communication method among the peripheral devices (e.g., a bus, a general purpose input and output (GPIO), a serial peripheral interface (SPI), a mobile industry processor interface (MIPI), etc.) and may exchange signals (e.g., commands, data, etc.).

The commands or data may be transmitted or received between the electronic device ED01 and the external electronic device ED04 via the server ED08 connected to the second network ED99. Other electronic devices ED02 and ED04 may be the devices that are the same as or different kinds from the electronic device ED01. All or some of the operations executed in the electronic device ED01 may be executed in one or more devices among the other electronic devices ED02, ED04, and ED08. For example, when the electronic device ED01 has to perform a certain function or service, the electronic device ED01 may request one or more other electronic devices to perform some or entire function or service, instead of executing the function or service by itself. One or more electronic devices receiving the request execute an additional function or service related to the request and may transfer a result of the execution to the electronic device ED01. To this end, for example, a cloud computing, a distributed computing, or a client-server computing technique may be used.

Figure 12:
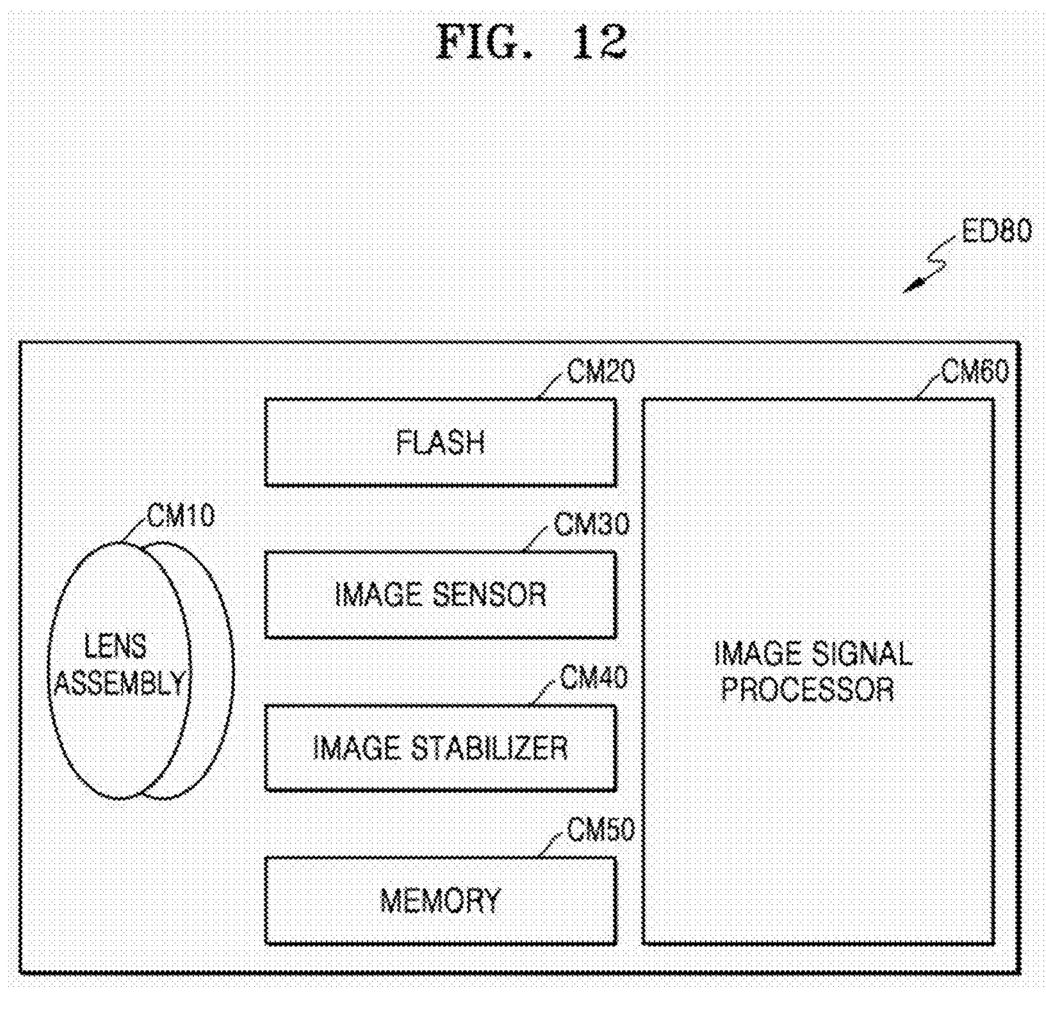
FIG. 12 is a block diagram showing a camera module provided in the electronic device of FIG. 11, according to an embodiment.

FIG. 12 is a block diagram showing an example of the camera module ED80 provided in the electronic device ED01 of FIG. 11.

The camera module ED80 may include the image acquisition device 100 described above, or may have a structure modified therefrom. Referring to FIG. 12, the camera module ED80 may include a lens assembly CM10, a flash CM20, an image sensor CM30, an image stabilizer CM40, a memory CM50 (a buffer memory, etc.), and/or an image signal processor CM60.

The lens assembly CM10 may collect light emitted from a subject for image capturing. The camera module ED80 may include a plurality of lens assemblies CM10, and in this case, the camera module ED80 may include a dual camera, a 360 degrees camera, or a spherical camera. Some of the lens assemblies CM10 may have the same lens attributes (a viewing angle, a focal length, auto focus, F-stop number, optical zoom, etc.), or different lens attributes. The lens assembly CM10 may include a wide angle lens or a telescopic lens.

The lens assembly CM10 may be configured and/or focus controlled so that two image sensors included in the image sensor CM30 may form an optical image of a subject at the same position.

The flash CM20 may emit light used to reinforce light emitted or reflected from a subject. The flash CM20 may include one or a plurality of light-emitting diodes (e.g., a RGB light-emitting diode (LED), a white LED, an infrared LED, an ultraviolet LED, etc.), and/or a xenon lamp.

The image stabilizer CM40, in response to a motion of the camera module ED80 or the electronic device ED01 including the camera module ED80, moves one or more lenses included in the lens assembly CM10 or the image sensor CM30 in a certain direction or controls the operating characteristics of the image sensor CM30 (e.g., adjusting of a read-out timing, etc.) in order to compensate for a negative influence of the motion. The image stabilizer CM40 may sense the movement of the camera module ED80 or the electronic device ED01 using a gyro sensor or an acceleration sensor arranged in or out of the camera module ED80. The image stabilizer CM40 may be implemented as an optical type.

The memory CM50 may store a part or entire data of an image acquired through the image sensor for a subsequent image processing operation. For example, when a plurality of images are acquired at high speed, only low resolution images are displayed while the acquired original data (e.g., Bayer-Patterned data, high resolution data, etc.) is stored in the memory CM50. Then, the memory CM50 may be used to transmit the original data of a selected (e.g., user selection, etc.) image to the image signal processor CM60. The memory CM50 may be incorporated into the memory ED30 of the electronic device ED01, or configured to be an independently operated separate memory.

The image signal processor CM60 may perform image processing on the image acquired through the image sensor CM30 or the image data stored in the memory CM50.

The image processing may include depth map generation, three-dimensional modeling, panorama generation, feature point extraction, image synthesis, and/or image compensation (e.g., noise reduction, resolution adjustment, brightness adjustment, blurring, sharpening, softening, etc.) The image signal processor CM60 may perform control (e.g., exposure time control, or read-out timing control, etc.) on constituent elements (e.g., the image sensor CM30, etc.) included in the camera module ED80. The image processed by the image signal processor CM60 may be stored again in the memory CM50 for additional processing or provided to external constituent elements (e.g., the memory ED30, the display device ED60, the electronic device ED02, the electronic device ED04, the server ED08, etc.) of the camera module ED80. The image signal processor CM60 may be incorporated into the processor ED20, or configured to be a separate processor operated independently of the processor ED20. When the image signal processor CM60 is configured by a separate processor from the processor ED20, the image processed by the image signal processor CM60 may undergo additional image processing by the processor ED20 and then displayed through the display device ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera.

Figure 13:
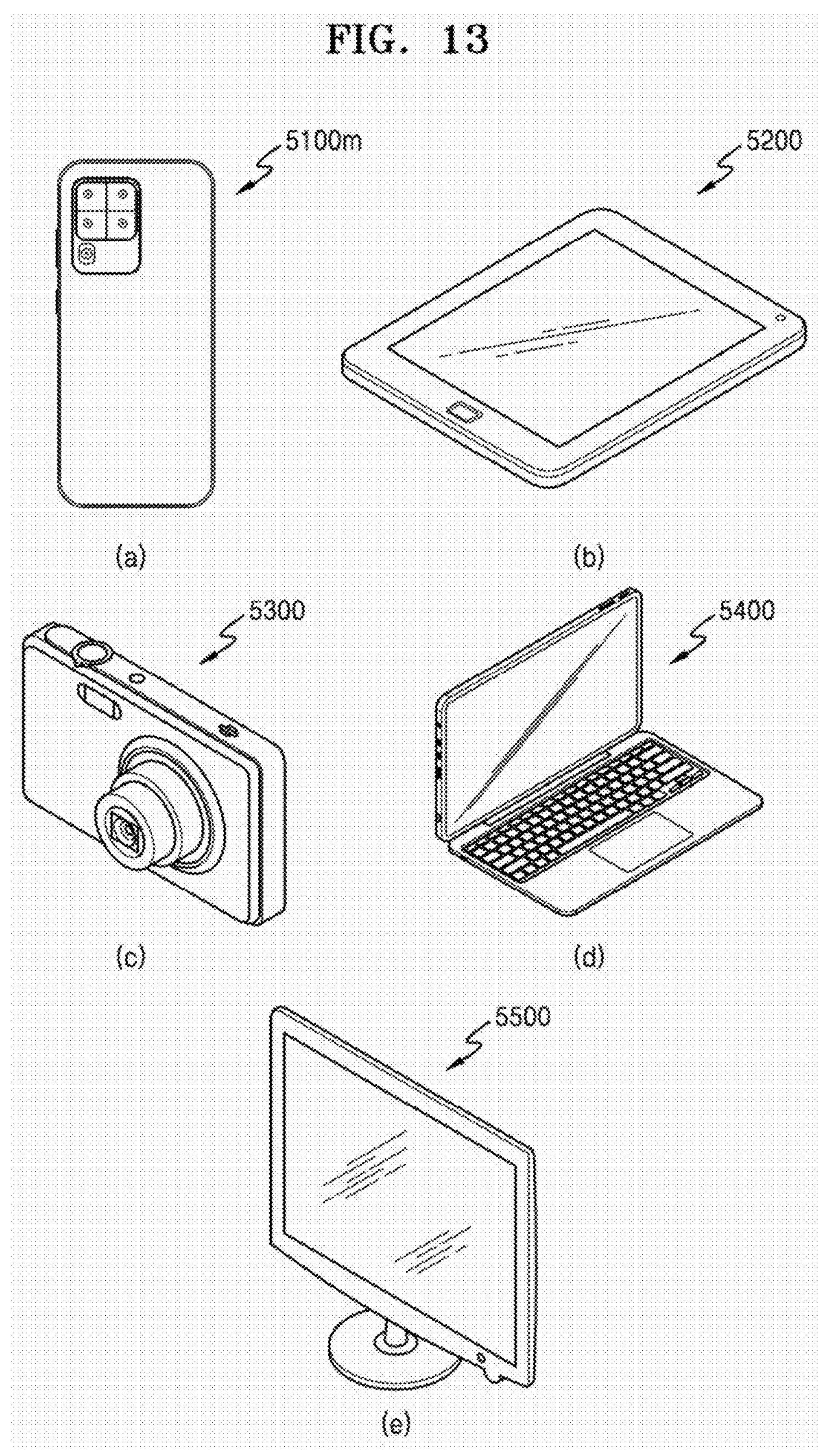
FIGS. 13 and 14 show various examples of electronic devices to which an image acquisition device may be applied, according to embodiments.
Figure 14:
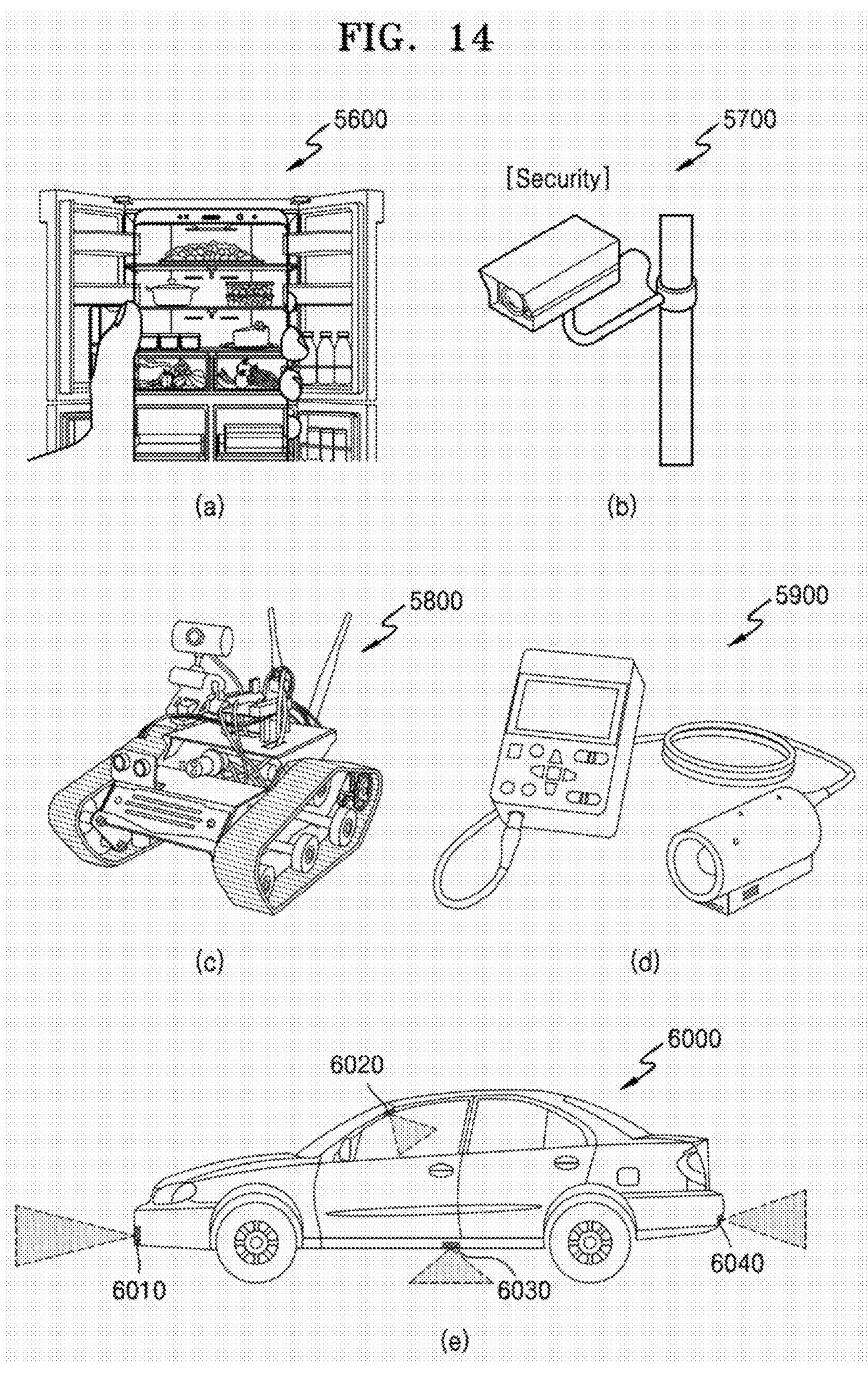

FIGS. 13 and 14 show various examples of electronic devices to which the image acquisition device 100 is to be applied according to some embodiments.

The image acquisition device 100 according to some embodiments may be applied to a mobile phone or smart phone 5100*m*, a tablet or smart tablet 5200, a digital camera or camcorder 5300, a notebook computer 5400, a television or smart television 5500 illustrated in FIG. 13, etc. For example, the smart phone 5100*m* or the smart tablet 5200 may include a plurality of high resolution cameras, each having a high resolution image sensor mounted thereon. Depth information of subjects in an image may be extracted using high resolution cameras, out focusing of the image may be adjusted, or subjects in the image may be automatically identified.

Furthermore, the image acquisition device 100 may be applied to a smart refrigerator 5600, a security camera 5700, a robot 5800, a medical camera 5900 illustrated in FIG. 14, etc. For example, the smart refrigerator 5600 may automatically recognize food in a refrigerator, using the image acquisition device 100, and notify a user of the presence of a particular food, the type of food that is input or output, and the like, through a smartphone. The security camera 5700 may provide an ultrahigh resolution image and may recognize an object or a person in an image in a dark environment using high sensitivity. The robot 5800 may be provided in a disaster or industrial site that is not directly accessible by people, and may provide a high resolution image. The medical camera 5900 may provide a high resolution image for diagnosis or surgery, and thus a field of vision may be dynamically adjusted.

Furthermore, the image acquisition device 100 may be applied to a vehicle 6000 as illustrated in FIG. 14. The vehicle 6000 may include a plurality of vehicle cameras 6010, 6020, 6030, and 6040 arranged at various positions, and each of the vehicle cameras 6010, 6020, 6030, and 6040 may include the image acquisition device 100 according to an embodiment. The vehicle 6000 may provide a driver with various pieces of information about the inside or periphery of the vehicle 6000, using the vehicle cameras 6010, 6020, 6030, and 6040, thereby providing an object or a person in an image may be automatically recognized and information needed for autonomous driving.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it should be understood by those of ordinary skill in the art that various changes in form and details may be made therein without departing from the spirit and scope as defined by the following claims.

What is claimed is:

1. An image acquisition device comprising:

a multispectral image sensor configured to acquire a first image using four or more channels;

a red-green-blue (RGB) image sensor configured to acquire a second image using a red (R) channel, a green (G) channel, and a blue (B) channel; and a processor configured to perform calibration on the acquired first image, based on a guided image generated based on the second image, wherein the processor is further configured to:

perform registration on the first image to obtain a registered first image, and perform the registration on the second image to obtain a registered second image, and generate the guided image based on the registered second image on which the registration has been performed with respect to the registered first image, and perform calibration on the first image, based on the guided image.

2. The image acquisition device of claim 1, wherein the processor is further configured to generate the guided image based on a channel signal corresponding to at least one of the R channel, the G channel, and the B channel, and perform calibration on the first image, based on the guided image.

3. The image acquisition device of claim 1, wherein the processor is further configured to perform the registration using an affine transformation based on external factors of the multispectral image sensor and the RGB image sensor, and wherein the external factors comprise at least one of positions, posture information, angles of view, and focal lengths of the multispectral image sensor and the RGB image sensor.

4. The image acquisition device of claim 1, wherein the processor is further configured to perform the registration on the first image and the second image by at least one of performing feature matching on the first image and the second image and calculating an optical flow between the first image and the second image.

5. The image acquisition device of claim 1, wherein the processor is further configured to:

generate the guided image based on at least one of a first channel signal and a second channel signal acquired by converting the first channel signal into at least one color space from among a YCbCr color space, an XYZ color space, and a Lab color space, and perform calibration on the first image, based on the guided image, wherein the first channel signal comprises at least one of an R channel signal corresponding to the R channel, a G channel signal corresponding to the G channel, and a B channel signal corresponding to the B channel, and wherein the second channel signal comprises a Y component or an L component corresponding to illuminance.

6. The image acquisition device of claim 1, wherein the processor is further configured to:

generate three or more candidate guided images based on a first channel signal, select a guided image corresponding to each channel of the four or more channels from among the three or more candidate guided images based on wavelength bands corresponding to the three or more candidate guided images, and perform the calibration on the first image, based on the selected guided image, and wherein the first channel signal comprises at least one of an R channel signal corresponding to the R channel, a G channel signal corresponding to the G channel, and a B channel signal corresponding to the B channel.

7. The image acquisition device of claim 1, wherein the processor is further configured to:

transform an entire region or a local region of the generated guided image, based on properties of the multispectral image sensor, and perform the calibration on the first image, based on the transformed guided image, wherein the properties of the multispectral image sensor comprise at least one of resolution, dynamic range, and sharpness.

8. The image acquisition device of claim 1, wherein the processor is further configured to:

perform registration on the generated guided image based on the first image to obtain a registered guided image, and perform the calibration on the first image based on the registered guided image.

9. The image acquisition device of claim 8, wherein the processor is further configured to:

detect luminance of each first pixel of a plurality of first pixels included in the first image to calculate a first luminance variation between first adjacent pixels of the plurality of first pixels, detect luminance of each second pixel of a plurality of second pixels of the registered guided image to calculate a second luminance variation between second adjacent pixels of the plurality of second pixels, and calibrate the first luminance variation to be equal to the second luminance variation, with respect to each first pixel of the plurality of first pixels, and wherein positions of the plurality of second pixels within the registered guided image correspond to positions of the plurality of first pixels within the first image.

10. The image acquisition device of claim 8, wherein the processor is further configured to perform the calibration on the first image by using a guided filter, and wherein the guided filter is configured to linearly process the first image based on the registered guided image.

11. The image acquisition device of claim 1, wherein the processor is further configured to:

detect at least one of a range and a shape of a wavelength included in a spectrum of light incident on the image acquisition device based on the first image, perform first calibration on the first image based on fixed pattern noise corresponding to the range or the shape to obtain a calibrated first image, and perform second calibration on the calibrated first image based on the guided image.

12. The image acquisition device of claim 1, wherein the processor is further configured to:

detect at least one of a range and a shape of a wavelength included in a spectrum of light incident on the image acquisition device based on the first image, generate a first correction image by performing first calibration on the first image based on fixed pattern noise corresponding to the range or the shape, generate a second correction image by performing second calibration on the first image based on the guided image, and obtain a weighted sum of the first correction image and the second correction image.

13. The image acquisition device of claim 1, wherein the processor is further configured to perform the calibration on the first image by inputting the acquired first image and the acquired second image into a deep learning network to obtain a calibrated first image, wherein the deep learning network comprises network parameters determined using a pair of the first image and the second image, and wherein the deep learning network is trained using, as a loss function, an error based on the first image and the calibrated first image.

14. An image acquisition device comprising:

a multispectral image sensor configured to acquire a first image using four or more channels; and a processor configured to:

detect a band or a shape of a wavelength included in a spectrum of light incident on the image acquisition device based on the first image, and perform calibration on the first image based on fixed pattern noise corresponding to the band or the shape.

15. A method, performed by an image acquisition device, of acquiring an image, the method comprising:

acquiring a first image using four or more channels by using a multispectral image sensor;

acquiring a second image using a red (R) channel, a green (G) channel, and a blue (B) channel from a red-green-blue (RGB) image sensor; and performing calibration on the acquired first image based on a guided image generated based on the second image, wherein the method further comprises:

performing registration on the first image to obtain a registered first image, and performing the registration on the second image to obtain a registered second image, and generating the guided image based on the registered second image on which the registration has been performed with respect to the registered first image, and performing calibration on the first image, based on the guided image.

16. The method of claim 15, wherein the performing of the calibration comprises:

generating the guided image based on at least one of a first channel signal and a second channel signal acquired by converting the first channel signal into at least one color space from among a YCbCr color space, and XYZ color space, and a Lab color space, and performing calibration on the first image, based on the guided image wherein the first channel signal comprises at least one of an R channel signal corresponding to the R channel, a G channel signal corresponding to the G channel, and a B channel signal corresponding to the B channel, and wherein the second channel signal comprises a Y component or an L component representing illuminance.

17. The method of claim 15, wherein the performing of the calibration comprises generating three or more candidate guided images, based on a first channel signal;

selecting a guided image corresponding to each of the four or more channels from the three or more candidate guided images, based on wavelength bands corresponding to the three or more candidate guided images; and performing the calibration on the first image, based on the selected guided image, and wherein the first channel signal includes at least one of an R channel signal corresponding to the R channel, a G channel signal corresponding to the G channel, and a B channel signal corresponding to the B channel.

18. The method of claim 15, wherein the performing of the calibration comprises:

detecting a range or a shape of a wavelength included in a spectrum of light incident on the image acquisition device, based on the first image;

performing first calibration on the first image, based on fixed pattern noise corresponding to the range or the shape to obtain a calibrated first image; and performing second calibration on the calibrated first image based on the guided image.

19. The method of claim 15, wherein the performing of the calibration comprises:

detecting a range or a shape of a wavelength included in a spectrum of light incident on the image acquisition device based on the first image;

generating a first correction image by performing first calibration on the first image based on fixed pattern noise corresponding to the range or the shape;

generating a second correction image by performing second calibration on the first image based on the guided image; and obtaining a weighted sum of the first correction image and the second correction image.

* * * * *